Nov. 16, 1971  F. R. HULL  3,620,183
MARINE JET PROPULSION SYSTEM
Filed Feb. 17, 1969  8 Sheets-Sheet 1
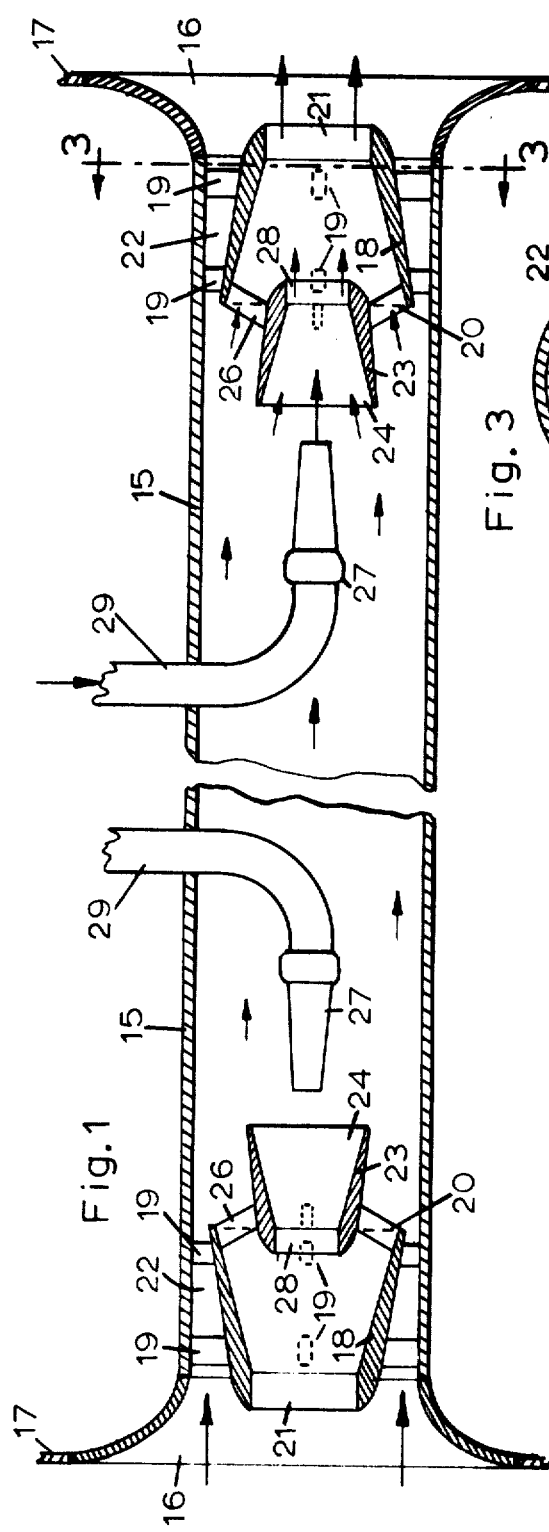
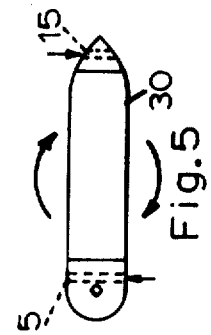
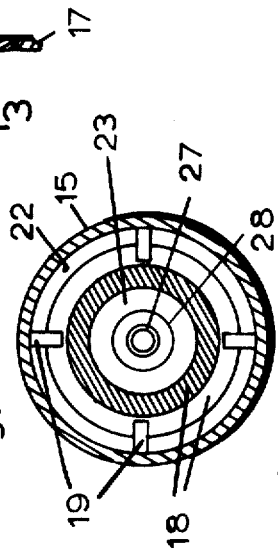
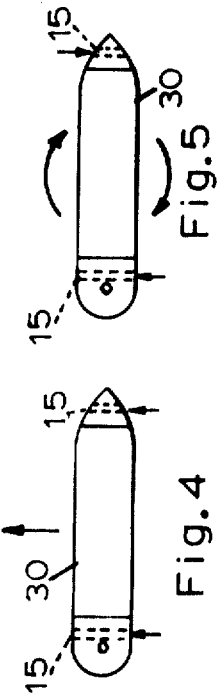
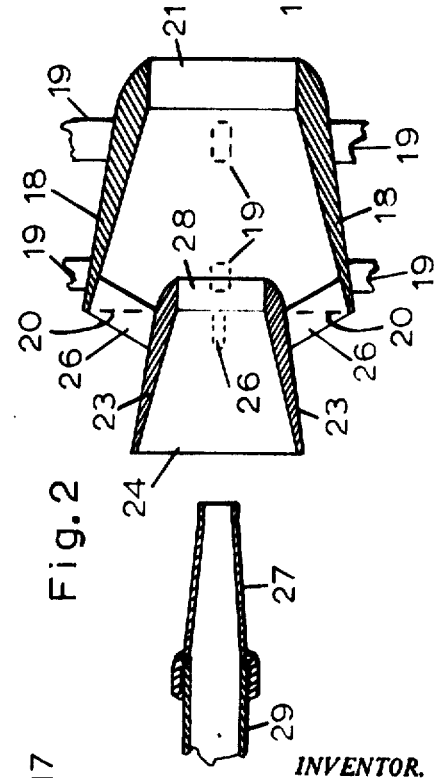
INVENTOR.
Francis R. Hull
BY Robert U. Geib Jr.

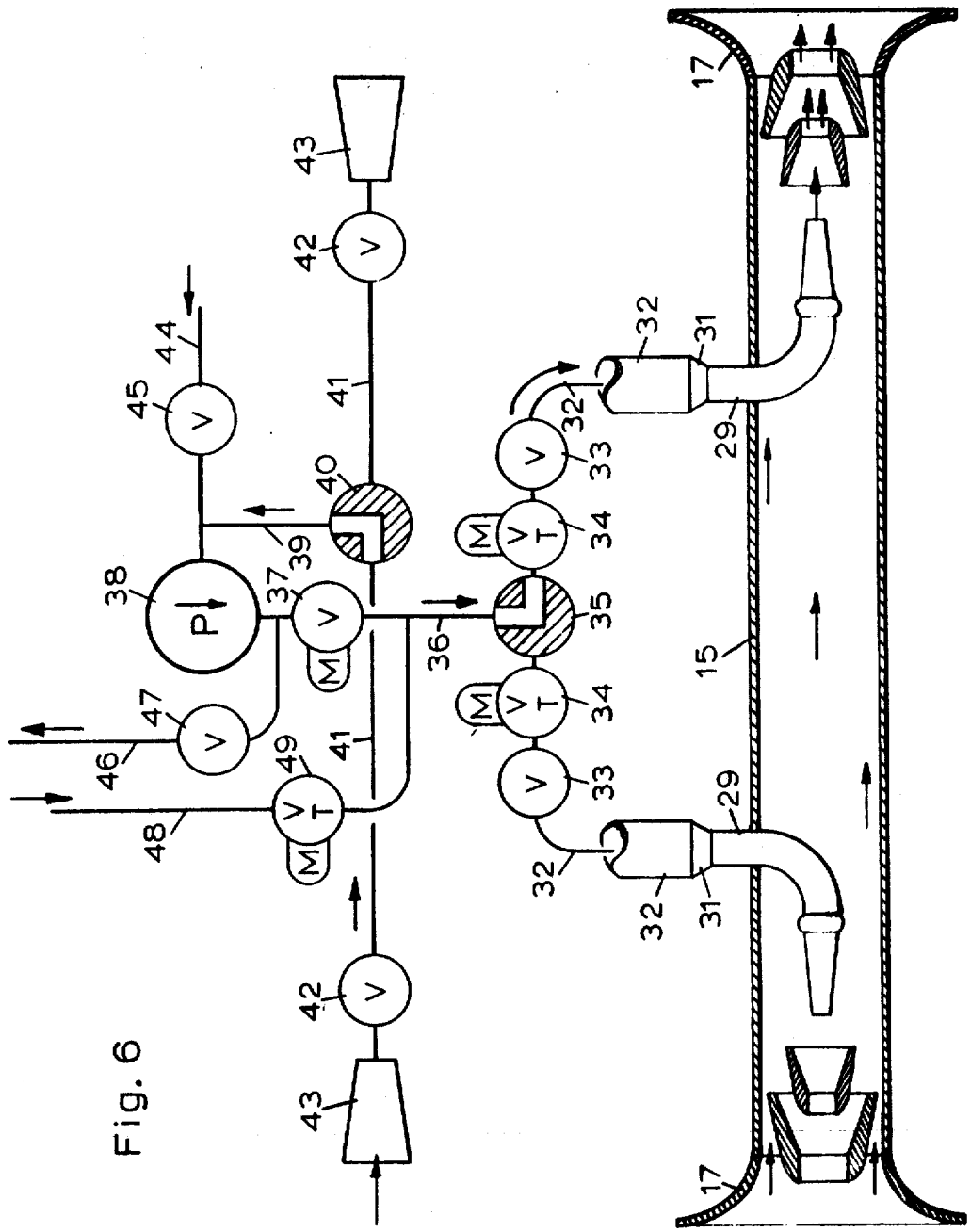

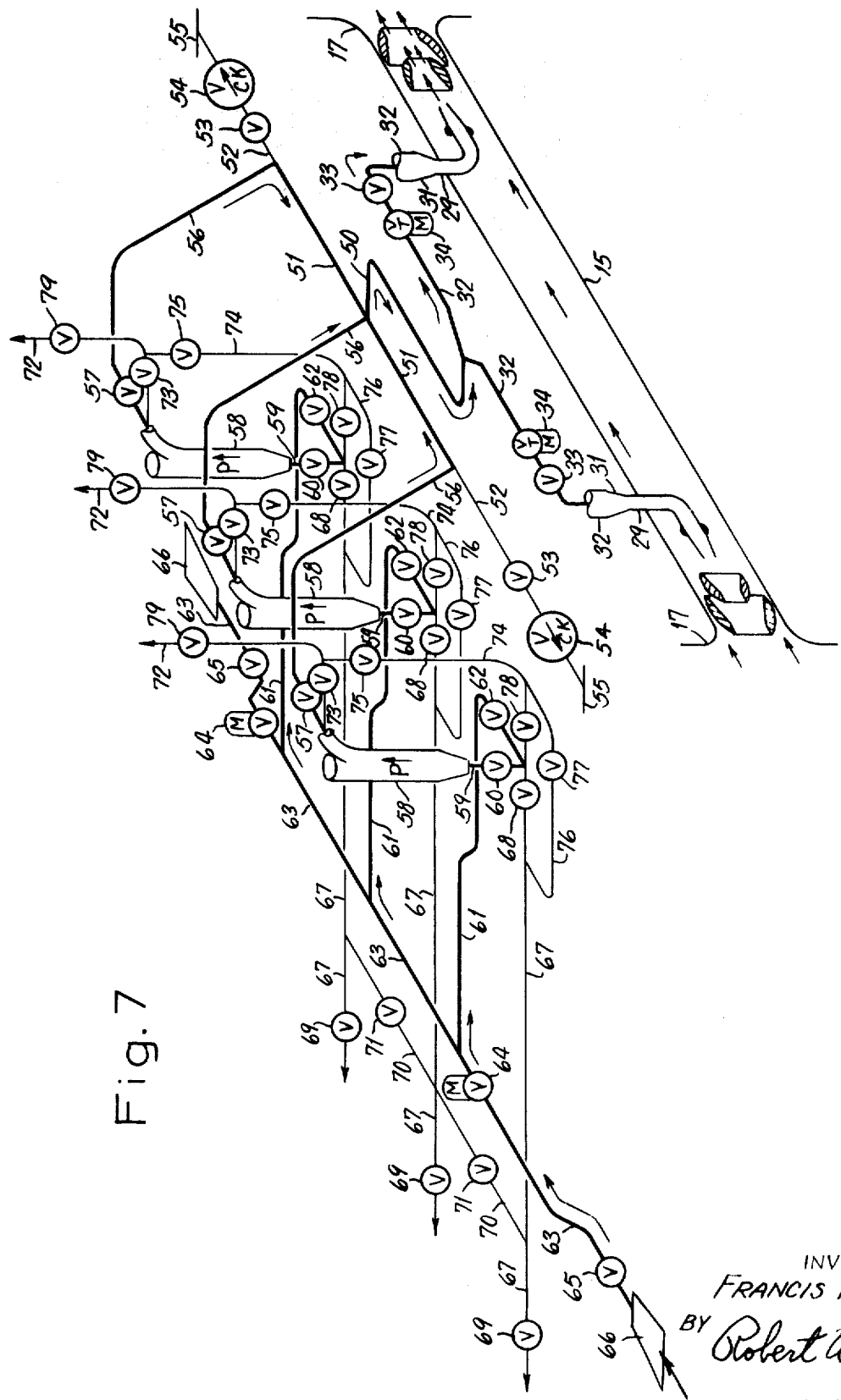

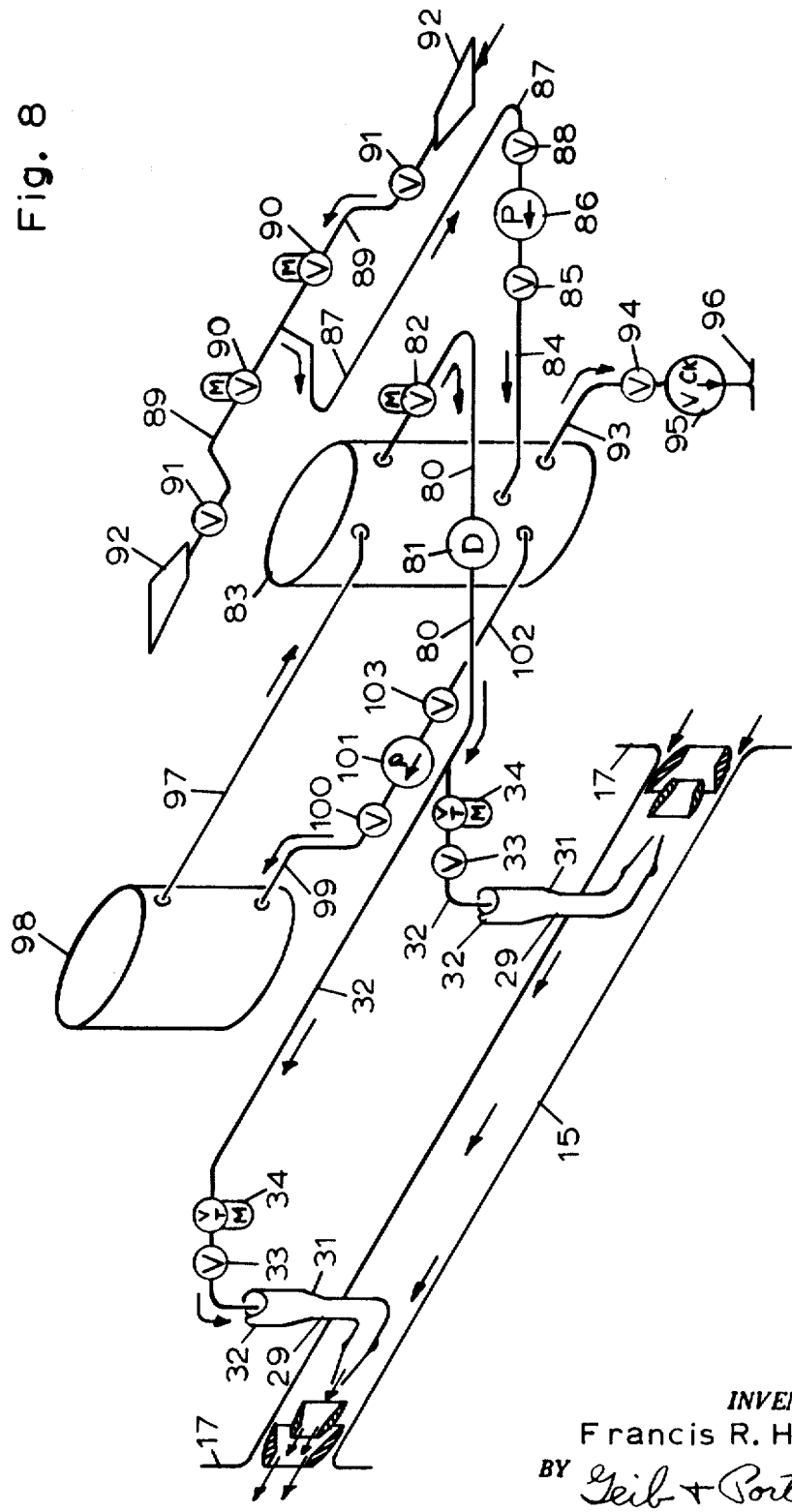

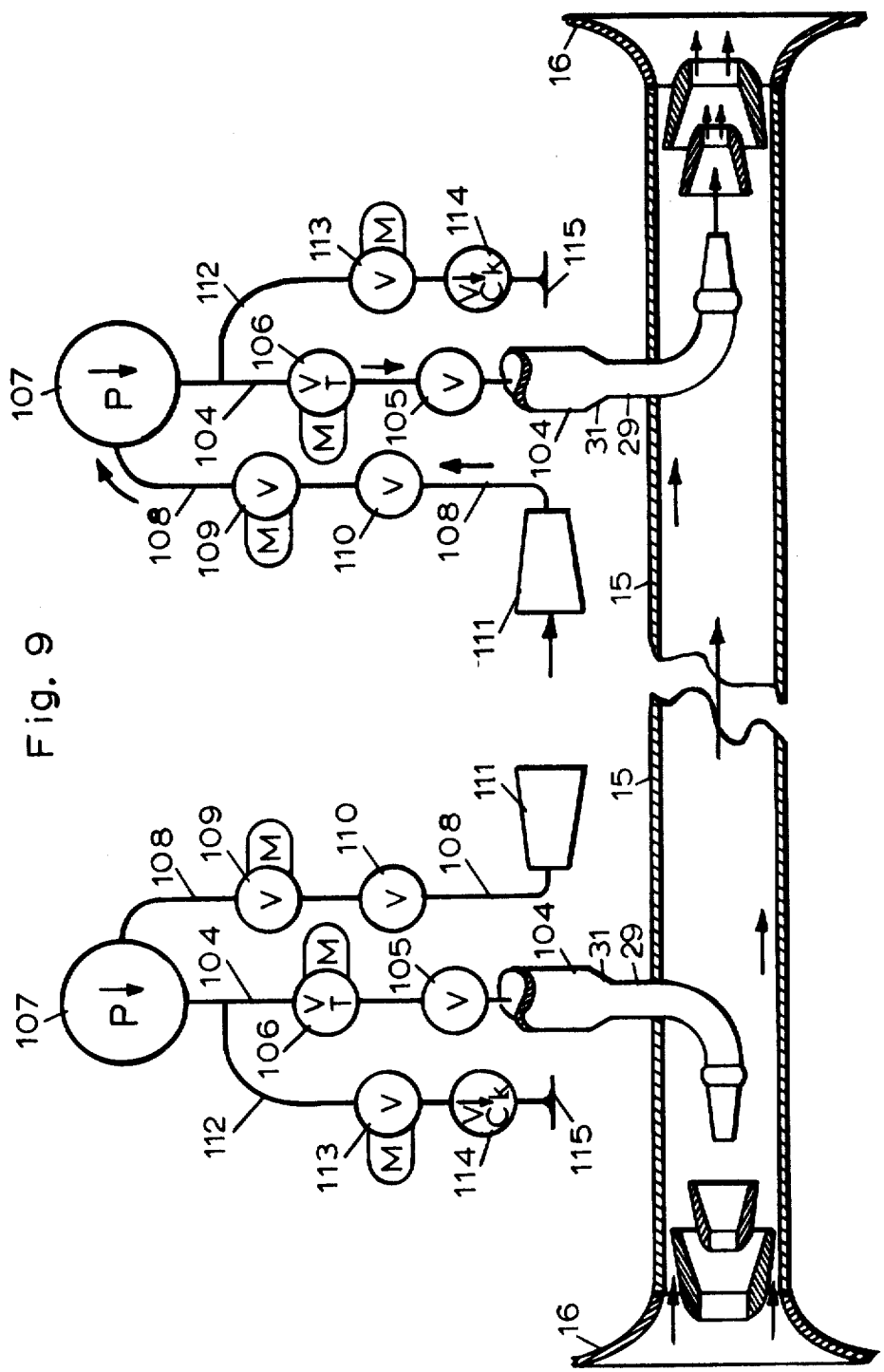

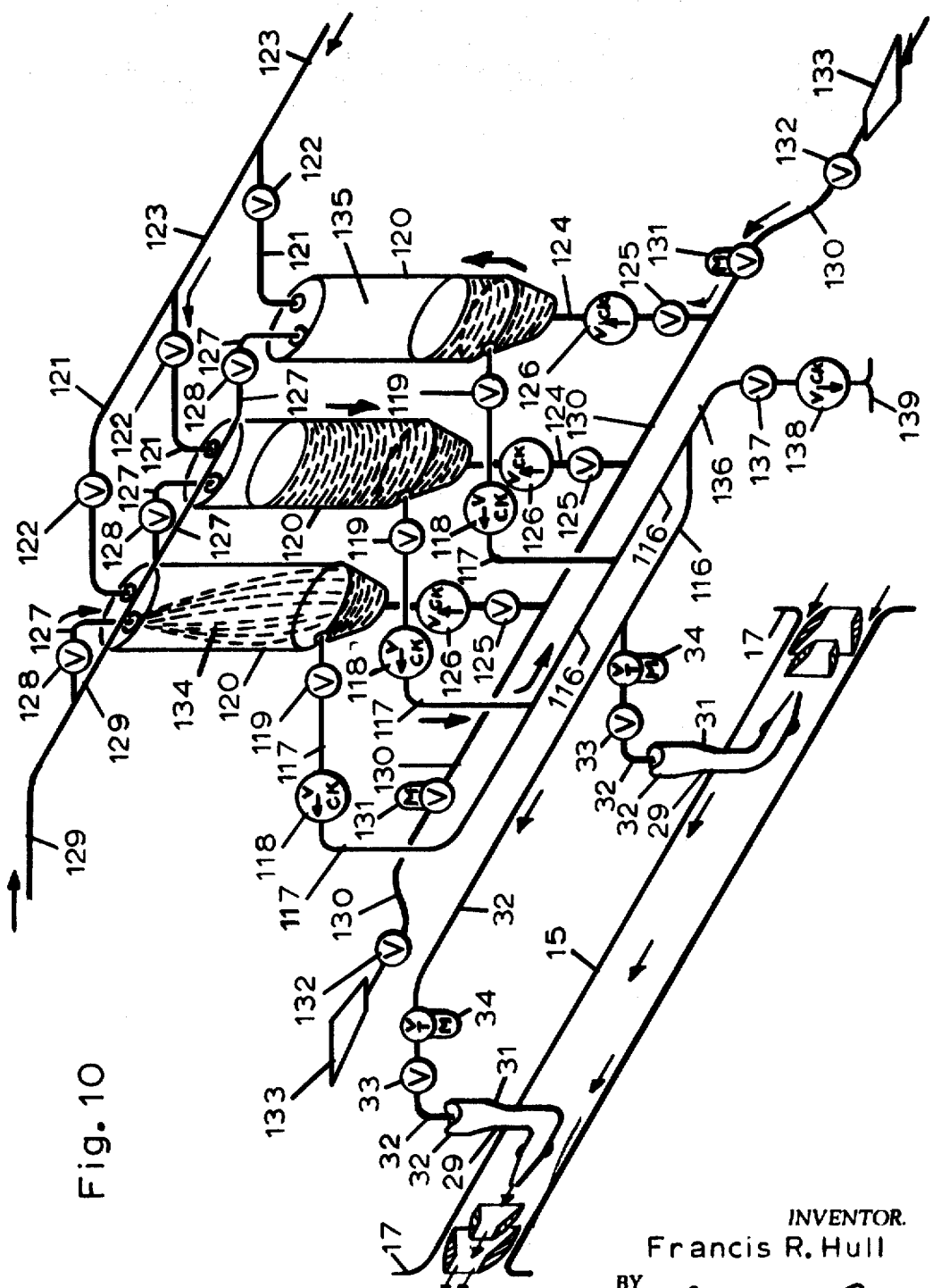

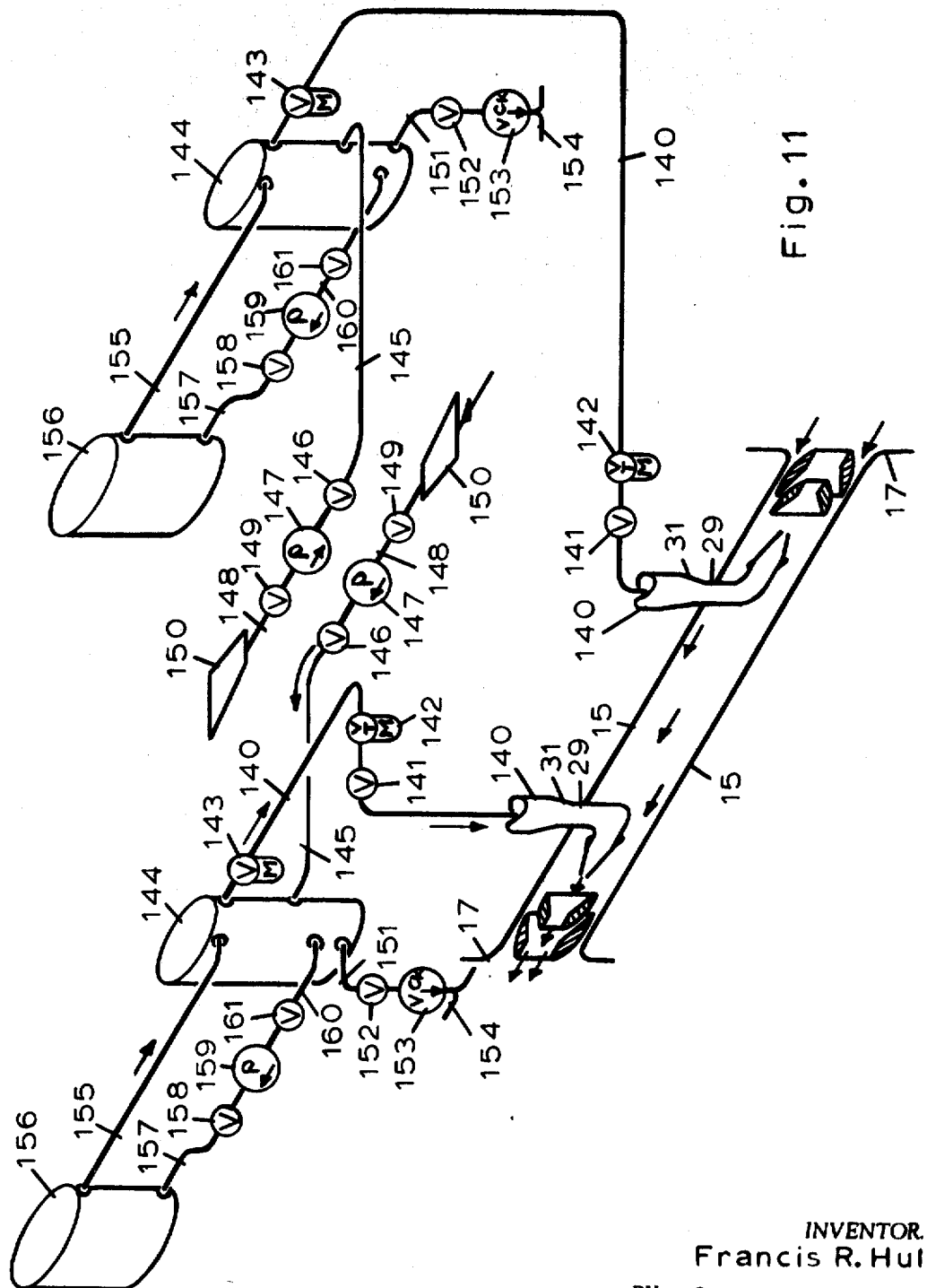

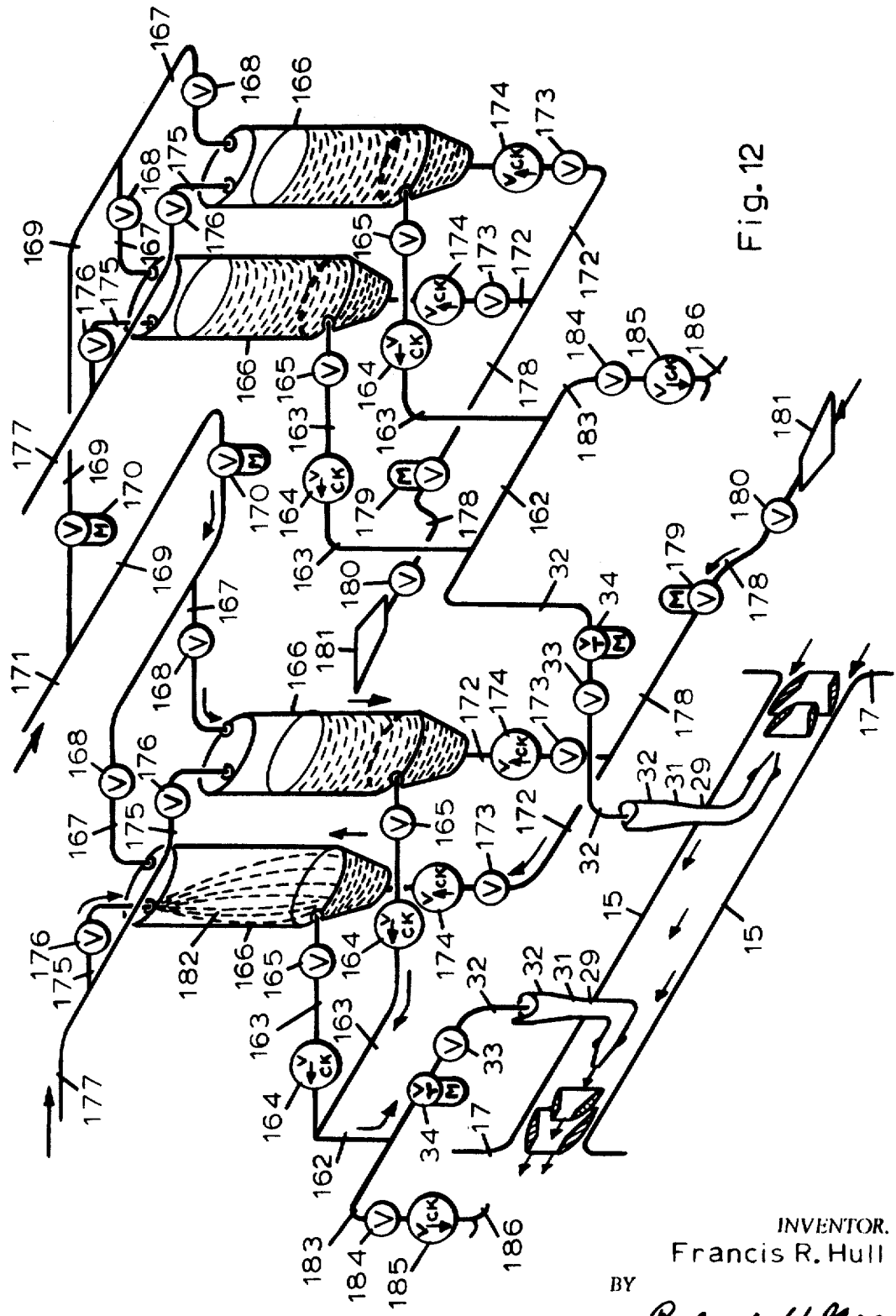

United States Patent Office 3,620,183
Patented Nov. 16, 1971

3,620,183
MARINE JET PROPULSION SYSTEM
Francis R. Hull, 140 W. 88th St.,
New York, N.Y. 10024
Continuation-in-part of applications Ser. No. 701,262,
Dec. 6, 1957, Ser. No. 277,071, Apr. 29, 1963, Ser. No.
353,700, Mar. 23, 1964, Ser. No. 492,959 Aug. 27,
1965, Ser. No. 554,614, Apr. 27, 1966, Ser. No. 666,234,
Aug. 9, 1967, and Ser. No. 732,476, Apr. 25, 1968.
This application Feb. 17, 1969, Ser. No. 814,475
Int. Cl. B63h 25/46
U.S. Cl. 114—151                                    55 Claims

ABSTRACT OF THE DISCLOSURE

This invention relates to the propulsion of marine vessels by means of a reversible jet-reaction ejector structure composed in part of oppositely-directed secondary-nozzle ejector stagings whose members are disposed in tandem with respect to each other to act successively on fluids passing through an active ejector staging. The invention includes means for supplying pressurized motive liquids to the reversible ejector structure from fluid pumps, pressurized motive steam for condensing steam jets from saline conversion power plants, and pressurized motive liquids from the displacement-type pressure vessels of a pulse-jet propulsion system which is actuated by a saline conversion power plant. The invention also includes independent pulse-jet propulsion means.

The present application is a continuation-in-part of my patent application Ser. No. 701,262 entitled "Jet Reaction Tube Structure for Marine Propulsion," filed Dec. 6, 1957 (now abandoned); my patent application Ser. No. 277,071 entitled "Marine Jet Propulsion System," filed Apr. 29, 1963 (now abandoned); my patent application Ser. No. 353,700 entitled "Marine Jet Propulsion System," filed Mar. 23, 1964 (now abandoned); my patent application Ser. No. 492,959 entitled "Marine Jet Propulsion System," filed Aug. 27, 1965 (now abandoned); my patent application Ser. No. 554,614 entitled "Marine Jet Propulsion System," filed Apr. 27, 1966 (now abandoned); my patent application Ser. No. 666,234 entitled "Marine Jet Propulsion System," filed Aug. 9, 1967 (now abandoned); and my presently pending patent application Ser. No. 732,476 entitled "Marine Jet Propulsion System," filed Apr. 25, 1968 (now abandoned).

This invention relates to hydraulic jet propulsion systems wherein thrust and pressure augmentation is desired on a reversible basis, and particularly such systems as used in connection with marine vessels, although not limited thereto.

The invention also contemplates augmentation of the thrust produced on expansion of a fluid medium through a nozzle orifice by alternately directing motive-fluids into a system of reversible, opposed thrust-augmenting secondary-nozzle stagings having integral motive nozzles, the entire assemblage being centrally-mounted within the confines of a tubular housing or channel.

It is among the objects of the present invention to provide a means of comparatively simple construction with which the movements of a mobile body, such as a marine vessel, may be easily effected and controlled as applied to the forward, reverse and lateral propulsion thereof, and to the turning of the vessel.

Another object is to provide means with which the mobile body or vessel may be propelled laterally in either direction or turned through any angle about a vertical axis with maximum effectiveness as the movement of the mobile body or vessel may require, and which will permit the positive and accurate control of said movement at all times. The in-port handling of marine vessels is an example of vessel maneuvering which may be effected by the apparatus of the invention. This in-port handling has usually been accomplished with the assistance of harbor tugs, and other power sources which are extraneous to the propulsion system of the vessel.

Still another object is to provide propulsive means of the type described which is part of the vessel itself and actuated from sources which are inherent to the power plant apparatus thereof, the said propulsive means enabling turning lateral, or forward and reverse movements with maximum facility.

An additional objective is to provide a combined piping and jet reaction propulsion system so disposed as to convert the maximum amount of available fluid energy into useful propulsive thrust, where the jet propulsion structure has been mechanically activated by means of a pump.

As used
The term "fluid" shall refer to any liquid or gaseous medium;

The term "reversible" shall refer to a system of opposed, concentrically-mounted thrust augmenter and nozzle stagings together with its motive fluid piping system which may discharge its fluid output with equal facility in opposite directions. The thrust produced by one such staging is equal to the thrust of the motive nozzle, and the thrust of the secondary, augmenting nozzle(s);

The term "motive fluid" shall refer to the high-velocity particles of a fluid jet, together with its connecting piping system;

The term "suction fluid" shall relate to the fluid which is being accelerated by contact with the motive fluid;

The terms "augmenting" and "augmenter" shall relate to secondary nozzles which convert the kinetic energy of the fluid particles of a high-velocity jet to useful thrust by the mechanism of momentum interchange between the particles of the motive and suction fluid streams, after the high-velocity particles of the motive fluid stream have issued from a nozzle orifice.

The term "ejector passage" shall relate to the fluid passage of an ejector structure which provides one or more nozzle passage branches for guiding the acceleration of suction fluids under the influence of a motive-fluid stream;

The term "ejector staging" shall relate to an ejector structure composed of a motive nozzle and one or more secondary nozzles arranged concentrically in tandem with respect to each other so that an upstream nozzle member discharges into the central bore of the next downstream nozzle member, and each secondary-nozzle member is disposed to admit suction fluids thereinto;

The term "secondary-nozzle staging" shall refer to a plural assemblage of individual secondary-nozzle members arranged concentrically in tandem with respect to each other so that an upstream secondary-nozzle member discharges into the central bore of the next downstream secondary nozzle member, and each secondary-nozzle member is disposed to admit fluids thereinto.

For a mobile vehicle which is propelled by the acceleration of fluids surrounding the vehicle, and where the intake of the fluid being accelerated through the propulsor is directed opposite the direction of final discharge, propulsion efficiency is given by the expression:

$$E = \frac{2V_s}{V_j + V_s} \text{ (E approaches 100\% as } V_j \text{ approaches } V_s\text{)}$$

where $V_s$ is the absolute velocity of the vehicle and $V_j$ is the absolute final velocity of the propelling fluid leaving the propulsion system in the direction of final discharge Maximum theoretical propulsion efficiency in this case is limited to 100%. In a practical sense the highest propulsive efficiencies are attained where a maximum of fluid kinetic energy has been converted to propulsive thrust, and final discharge velocities from the propulsion system are very low.

When a surrounding fluid which is being accelerated through the propulsor of a mobile vehicle enters the intake of the propulsion system from any direction other than that opposite the direction of final discharge, a part of the work done by the propulsor must be expended to accelerate fluid particles at the intake to vehicle speed in the direction of propulsion. For example, should the suction intake be directed at right angles to the direction of vehicle propulsion, propulsive efficiency is then expressed by:

$$E = \frac{2(V_j - V_s)V_s}{V_j^2} \quad \text{(E approaches 50\% } V_j \text{ approaches } 2V_s\text{)}$$

Maximum theoretical propulsion efficiency in this case is limited to 50%, due to the additional work which must be done by the propulsor to accelerate fluid particles at the intake to vehicle speed in the direction of propulsion.

Another of the important teachings of the present invention is to provide for the use of a condensing vapor as the high-velocity motive fluid, in order to increase the amount of suction fluid entrained and discharged through the secondary nozzle(s). Under the influence of the absolute head of suction fluid in which the structure operates, large amounts of suction fluid will continuously attempt to displace the difference in volumes occasioned by the state change of the motive fluid. It should be realized that the absolute head of suction fluid in which the structure operates would include ram pressure contributions at the enlarged entrances of individual thrust augmenters which are due to the effects of vehicle speed. The configuration of the secondary nozzle itself can serve to channel the flow into the throat thereof of rapidly moving suction fluid, and to assist in increasing the amount of suction fluid discharged from an active secondary nozzle staging. In a marine application steam would serve as the motive fluid, while the water in which the vessel navigates would serve as the suction fluid.

With the foregoing objects in view, together with others which will appear as the description proceeds, the invention resides in the novel construction, assemblage, and arrangement of parts which will be described more fully in the discussion, illustrated in the drawings, and particularly pointed out in the claims.

In the drawings:

FIG. 1 is a longitudinal sectional view taken through apparatus involving the invention while it is in the form of a propulsion tube, as installed transverse to the fore-and-aft axis of a marine vessel, for the purpose of effecting lateral and turning movements of the vessel.

FIG. 2 is an enlarged longitudinal sectional view of an augmentation staging and motive nozzle.

FIG. 3 is a transverse sectional view taken substantially on the line 3—3 of FIG. 1.

FIG. 4 is a diagrammatic plan view of a conventional marine vessel showing the phantom position of laterally disposed athwartship propulsion tubes, with the arrows indicating the direction of vessel motion as it is being propelled laterally.

FIG. 5 is a view similar to that of FIG. 4 with the arrows indicating the turning of the vessel about a vertical axis when the two laterally disposed propulsion tubes act together as a couple.

FIG. 6 is a schematic diagram of the combined motive-fluid piping system and the jet reaction apparatus of the invention, the exterior arrows indicating the direction of flow within the motive-fluid piping system when two-way valves 40 and 35 are positioned as indicated, and the motive-fluid piping system together with the jet reaction structure of FIG. 1 are mechanically actuated by means of a pump.

FIG. 7 is an isometric schematic diagram of a combinative, multi-purpose cargo piping and maneuvering system such as may be used abroad a large tank vessel. In this view the exterior arrows indicate the direction of fluid flow within the motive-fluid piping system when the transverse jet reaction structure of FIG. 1 is actuated by a plurality of pumps.

FIG. 8 is an isometric schematic diagram of a saline-conversion type power plant which may continuously supply pressurized motive steam to the reversible ejector passage of the invention. The saline-conversion type power plant may continuously receive and evaporate raw saline feed water while rejecting salts and other impurities therefrom. Exterior arrows indicate the direction of fluid flow within piping branches of the power system.

FIG. 9 is a schematic diagram of a mechanically-actuated hydraulic-jet propulsion system wherein the individual nozzle supply pipes 29 of FIG. 1 are each supplied by a separate fluid pump and motive-fluid piping system.

FIG. 10 is an isometric schematic diagram of a multiple form of pulse-jet propulsion where sequenced pulses of high-pressure motive fluid are supplied to either motive nozzle of the reversible ejector structure. Each member of a plurality of displacement cylinders alternately receives low-pressure motive liquids and high-pressure steam thereinto. High-pressure motive liquids are expelled from each displacement cylinder in alternate sequence as separate pulses of motive energy. Spent low-pressure steam is condensed by an interior jet spray within the displacement cylinder after the discharge of pressurized motive fluids. Exterior arrows indicate the direction of fluid flow within various piping branches of the pulse-jet propulsion system.

FIG. 11 is a line isometric schematic diagram of a thermodynamically-actuated hydraulic-jet propulsion system wherein the individual nozzle supply pipes 29 of conduit or channel 15 are each alternately supplied with pressurized motive steam from a separate saline conversion power plant or other steam source.

FIG. 12 is a line isometric schematic diagram of a hydraulic-jet propulsion system wherein individual nozzle supply pipes 29 of FIG. 1 are each supplied with pressurized motive liquids from multiple displacement cylinders of separate pulse-jet systems similarly to the concept disclosed in connection with FIG. 10. The two separate pulse-jet systems are each actuated from a common steam supply source.

As applied to a maneuvering installation, the invention comprises an arrangement upon the vessel of laterally disposed reaction tubes located sufficiently below the water line so as to be at all times submerged, and which are actuated by means of a suitable piping system such as is illustrated in FIG. 6. Concentrically mounted along the longitudinal axis of these tubes or channels are opposed augmentation stagings, each of said stagings including several concentrically-mounted secondary nozzles and a centrally-disposed motive nozzle. These secondary nozzles may have either a convergent or a convergent-divergent configuration, and are for the purpose of channeling the flow of suction fluid into the area where mixing and momentum interchange with the particles of the motive-fluid jet take place. This channeling of suction fluid flow is brought to a focus at the throat of each secondary nozzle, and the combined discharge of motive and suction fluid from the discharge aperture of the said secondary nozzle produces a substantial addition to the thrust delivered by the motive nozzle. In addition, pinch-jet accelerating effects of suction-fluid flow into the annular nozzle passage formed by the exterior surfaces of the larger secondary nozzle member and the interior walls of the maneuvering tube at the tube entrance having the inactive staging will produce an additional thrust contribution which may be more than sufficient to cancel all drag force losses.

A vessel equipped with a laterally-disposed jet reaction tube in each of its ends which are installed transversely of the fore-and-aft axis of the vessel may execute maneuvers in any desired direction. Lateral and turning movements are easily effected by choosing the direction of jet discharge for each of the two jet reaction structures, and the strength of each individual thrust reaction can be varied within design limits by varying the supply pressure and fluid discharge from the appropriate motive nozzle by throttling. Additional advantages based on engineering economy, etc., may also be attained by a vessel so equipped since the maneuvering system may be actuated by multi-purpose pumps serving other operating needs.

As applied to a main propulsion system, the invention would comprise an arrangement upon the vessel of a longitudinally disposed fore-and-aft channel formed into the ship's bottom and conformed approximately to the longitudinal section of an ellipsoidal tube, the after end of which may be warped or flared into an effective diffuser section. According to such an embodiment the opposed thrust augmenter stagings would be mounted near the ends of this suberged fore-and-aft fluid passage, and the propulsion structure could be actuated by motive fluid which had been mechanically accelerated by pumps or by high-velocity, low-pressure steam which is supplied by a saline conversion power plant or by other boiler-type apparatus. In a main propulsion system actuated by motive-fluid injection steam, ram pressure effects would assume great importance as the vessel gains speed.

FIGS. 1 to 7 of the drawings illustrate the apparatus of the invention in its simplest forms and as used in connection with the maneuvering of a marine vessel.

More specifically, in FIG. 1 the numeral 15 designates a tube of substantially uniform internal diameter throughout its length, the same being disposed below the water line and secured in any suitable manner transversely to the fore-and-aft axis of the vessel. The ends of this tube 15 preferably terminate short of the vessel's sides in order to bring about a round or curved entrance 16 against the side plate 17 of the vessel. Arranged at each end of the tube 15 is an outer, augmenting, secondary nozzle 18 concentrically mounted in the tube by bracket or spider members 19. This secondary nozzle 18 is of substantially frusto-conical shape with its entrance 20 directed towards the mid-section of the tube and its discharge orifice or restricted end 21 directed out of the tube and away from the side of the vessel. As shown, the secondary nozzle entrance 20 is of less external diameter than the interior of the tube 15, thereby providing an annular nozzle passage 22. Each outer secondary nozzle 18 has arranged concentrically therewithin a smaller but similarly shaped secondary nozzle member 23. The entrance 24 of the minor or smaller secondary nozzle 23 is disposed adjacent to and spaced from the entrance 20 of the outer secondary nozzle member 18, the space between these two secondary nozzles thus providing a fluid passage 25 of annular section. The inner secondary nozzle 23 may be secured in proper assembled relationship within the entrance of secondary nozzle member 18 by suitable bracket or spider members 26.

Each of the complementary stagings of secondary nozzles 18 and 23 at the end of main tube 15 is provided with a motive-jet nozzle 27 which is concentrically mounted within the entrance of the inner or minor secondary nozzle 23. The axial position of the motive-jet nozzle 27 with respect to the secondary nozzle stagings 18 and 23 will depend upon the properties of the fluids handled, and the conditions under which the structure is to operate. Motive fluid under pressure may be supplied by any suitable means to a supply pipe 29 which is attached to and communicates with the motive jet nozzle 27.

With the inner and outer secondary nozzle members 18 and 23 respectively and their motive jet nozzles 27 arranged in the manner described, it will be seen that with one supply pipe or line 29 closed and the other supplying motive fluid under suitable pressure, the high-velocity discharge from motive jet nozzle 27 will induce the flow of suction fluid within the tube 15. The flow velocity increases as the suction fluid flows through fluid passages 25 between the inner secondary nozzle 23 and outer secondary nozzle 18, and through the annular nozzle passage 22 at the end of the tube having the inactive staging. Net forces act upon the fluid as it is accelerated through the structure; hence an equal and opposite force (reactive force) is experienced by the apparatus and the mobile body carrying it (i.e., the marine vesesl). The opposite movement of the vessel may be brought about by activating the motive-jet nozzle 27 on the opposite end of the tube 15, and closing off the supply line 29 on the reverse end. As before stated, the tube entrances 16 are rounded and this avoids friction losses at the suction end of the tube 15.

From the foregoing construction and arrangement, it is manifest that the mechanism of momentum interchange between particles of the high-velocity, motive-jet stream and particles of the suction fluid—together with the displacement effects of suction fluid acting upon the lower-pressure region of the high-velocity motive jet—will cause the large-scale entrainment of suction-fluid particles into the throat region of the secondary nozzle(s). Suction fluid velocity continues to increase on approach to the throat section 28 of the inner and minor secondary nozzle member 23, together with the throat section 21 of the outer secondary nozzle member 18; and the discharge of the mixture of motive and suction fluid from these secondary nozzle discharge orifices effects the principal thrust augmentation which is achieved by the apparatus of the invention.

Referring to FIG. 4, it will be observed that the vessel, indicated at 30, will be propelled laterally in the direction of the resultant vector, and that this vector equals the sum of the components of the two separate thrust reactions as indicated by the smaller arrows. Referring to FIG. 5, it will be noted that when the direction of fluid flow is alternated within the tubes 15, the vessel is caused to rotate about a vertical axis. When a propulsion tube at only one end of the vessel is actuated, a slower angular rotation, combined with small lateral displacement, can be brought about, as is frequently desirable in docking or in-port maneuvering.

As previously stated, FIG. 6 illustrates a schematic diagram of the combined motive-fluid piping system together with the jet reaction tube apparatus of FIG. 1. According to this embodiment when the motive-fluid piping system is actuated by the pump 38, flow proceeds in the direction indicated by the exterior arrows to the nozzle supply pipe 29, from whence it is injected into the reversible, double-acting jet reaction tube structure. Motive fluid enters the piping system through the intake 43 and proceeds into the motive suction pipe branch 41 through the valve 42 which is shown in open position. Motive fluid then enters the 2-way suction valve 40 and passes into the supply line 39 of pump 38. The motive fluid is accelerated by pump 38 and passes into discharge line 36 through open motor-driven valve 37. Flow then proceeds into 2-way discharge valve 35, and on into nozzle supply branch 32 through motor-driven throttle valve 34 and valve 33. Motive fluid then passes through concentric line reducer section 31 and enters motive-nozzle supply pipe 29.

It should be noted that where 2-way valves 40 and 35 are shifted so as to alternate motive fluid suction into the unused suction pipe branch 41, and to discharge into the opposite motive-fluid nozzle supply branch 32, flow of suction fluid within the tube 15 will be caused to proceed in a direction opposite that shown in FIGS. 1 and 6. In practice, 2-way valves 40 and 35 may be ganged together by means of oppositely-rotating gear shafts or other suitable means, in order to permit operation of these valves by a single control motor.

The motive-fluid piping system of FIG. 6 also provides for the injection of live steam into the jet reaction tube structure of FIG. 1 by means of steam supply pipe 48. Motor-driven valve 37 is closed when steam is to be used as the motive fluid. Steam flow would proceed from steam supply pipe 48 through motor-driven steam throttle valve 49 and into discharge line 36. Steam flow is then shunted into the appropriate motive-fluid nozzle supply branch by 2-way discharge valve 35. Steam flow then proceeds through open throttle valve 34, open valve 33, concentric line reducer section 31, and on into nozzle supply pipe 29. After discharge within the jet reaction tube structure of FIG. 1 by motive-jet nozzle 27, the motive steam will rapidly condense with turbulent mixing within inner and outer secondary nozzles 23 and 18, respectively. The absolute head of suction fluid within the active secondary nozzle(s) would cause the large-scale displacement of suction fluid from within tube 15 into the low-pressure region downstream of motive-jet nozzle 27. The steam supply to the motive-fluid piping system of FIG. 6 would normally be obtained from a spray-type desuperheater control unit, in order to insure tolerable entering steam temperatures and avoid metal damage due to thermal shock. It will, of course, be realized that the injection of live steam into the jet reaction structure of FIG. 1 can quickly provide large thrusts which may be of particular value in the emergency maneuvering of a marine vessel.

The motive-fluid piping system of FIG. 6 also permits the pump 38 together with its prime mover to serve operating needs of a marine vessel other than actuating the maneuvering system. When the motive-fluid 2-way suction valve 40 and the motor-driven valve 37 are selectively closed, the pump 38 is able to fulfill tasks such as discharging ballast water from aboard ship. Flow would then proceed into the pump suction line 44 through valve 45 and into the suction of pump 38. Flow then proceeds from pump 38 into pump discharge line 46 through valve 47. Ballast loading operations might also be effected by allowing flow to proceed selectively from motive-fluid suction branch 41 through 2-way suction valve 40, into pump supply line 39 past closed valve 45, and into the suction of pump 38. The flow would then proceed into pump discharge line 46 through valve 47.

It should be noted that the frusto-conical configuration of the concentrically mounted secondary nozzles 18 and 23 permits them to act as a multiple fluid brake or sea anchor against the movement of suction fluid within the tube 15 when the jet reaction structure is not actuated by the injection of a motive fluid. This arrangement would tend to retard and dampen the movement of the vessel when the reaction structures are not in use. In a maneuvering installation aboard ship where the tube structures are disposed transversely to the vessel's keel, inactive maneuvering tube would serve as a reversible fluid damper that tends to retard the swinging of the vessel about its course when underway. In a main propulsion installation where the tubular reaction structure is disposed within the ship's bottom parallel to the keel, the after secondary nozzle staging would serve as a secondary sea anchor for a vessel which was anchored or moored with its regular anchoring and mooring apparatus. In the latter application, drag forces due to currents flowing within the anchorage and acting principally upon the after secondary nozzle staging would help to stabilize an anchored vessel on a heading which was parallel to these currents.

It should be further noted that the total configuration of the maneuvering tube structure is such as to provide minimum resistance to the flow of suction fluid within an active propulsion tube, and to provide maximum resistance to the flow of fluid within an idle propulsion tube.

FIG. 7 is a line isometric schematic diagram which illustrates a combinative multi-purpose cargo piping and maneuvering system such as may be used aboard a tank vessel. The heavily weighted line components of the piping system represent branches which are used in connection with the maneuvering system. In this embodiment, motive sea-water enters the motive fluid piping system at the lower-left-hand corner of the drawing and is discharged into the maneuvering tube through the motive nozzle at the upper-right-hand-corner of the drawing. When suction flow within the maneuvering tube 15 proceeds to the right, and into the drawing as indicated, flow would normally proceed within the motive fluid piping system in the directions indicated by the arrows exteriorly of the branches of the motive fluid piping system.

According to the immediately aforementioned construction and arrangement, the motive fluid piping system is actuated by a plurality of axial-flow propeller-type cargo pumps 58. Motive sea-water enters intake sea chest 66 and passes into transverse suction main 63 through sea valve 65 and motor-driven valve 64. The plurality of pump suction branches 61 leading from the plurality of actuating pumps 58 are connected in parallel and separately communicate with the common transverse suction main 63. It should be noted that where motive flow proceeds within the motive fluid piping system in the directions indicated by the exterior arrows, the near motor-driven valve 64 in transverse suction main 63 would be open, while the far alternate motor-drive valve 64 would be closed.

Motive sea-water proceeds from the transverse suction main 63 into the pump suction branches 61 through valves 62 and on into pump suction lines 59 through valves 60. The motive sea-water is next accelerated by the plurality of pumps 58 and discharged into pump discharge branches 56 through valves 57. The pump discharge branches 56 of the plurality of actuating pumps 58 are connected in parallel and communicate separately with the common transverse discharge main 51.

The motive sea-water discharge streams combine in the common transverse discharge main and flow into motive fluid supply line 50 leading to the nozzle supply branches of the maneuvering tube (15). Flow proceeds from motive fluid supply line 50 into nozzle supply branch 32 through motor-drive throttle valve 34 and sea valve 33. From nozzle supply branch 32, the motive sea-water passes through concentric line reducer section 31 into nozzle supply pipe 29. It should be noted that when flow proceeds within maneuvering tube 15 in the direction indicated by the interior arrows, the near motor-driven throttle valve 34 of nozzle supply branch 32 would be closed while the far motor-driven throttle valve 34 leading to the active motive nozzle would be open.

It should be understood that the connection of an additional operating standby line from motive fluid supply line 50 leading to an overboard discharge connection in the ship's bottom and including an appropriate motor-driven valve and relief valve bypass will permit the plurality of pumps 58 to be operated on a standby basis from a remote control station. This feature permits the pumps to circulate motive sea-water within the motive fluid piping system without actuating the maneuvering tube 15 so as to exert lateral thrusts upon the vessel.

It will be understood that the valves of the entire multi-purpose piping system of FIG. 7 which serve system branches not in service during maneuvering operations will normally be closed when the motive fluid piping system has been actuated with sea water.

The mulit-purpose piping system of FIG. 7 serves other systems not connected with maneuvering, such as cargo-oil loading and discharge systems and sea-water ballast loading and discharge systems.

During cargo-oil loading operations, cargo oil is supplied to the ship's cargo tanks from refinery terminal facilities through deck manifold connections aboard the tank vessel. The cargo-oil flows from the deck manifold connections into filling and discharge lines 72 through valve 79 past closed pump discharge valve 73 into loading bypass branch 74 through loading bypass valve 75. The cargo oil then normally flows past the closed pump suction cut-out valve 78 into pump suction bypass 76 through suction bypass cut-out valve 77 and into cargo-tank service line 67. The cargo oil may then flow directly into members of the tank group associated with its original service line 67, through valve 69; or be shunted to adjacent cargo-tank service lines 67 (serving members of an adjacent tank group) through service line cross-over branches 70 and cross-over branch cut-out valves 71.

Where cargo oil is loaded in the manner described immediately hereinbefore, the pumps 58 are entirely bypassed by the incoming flow of cargo oil. Isolation of the pump 58 and its suction line 59 is adopted to keep the pumps and all piping associated with the maneuvering system free and clear of cargo oil. This permits the maneuvering system to be used following conclusion of loading operations, and eliminates the possible contamination of harbor waters by cargo oil when the tank vessel utilizes its manuvering system to clear the loading berth and leave the harbor.

During cargo-oil discharging operations, the tank vessel discharges its cargo oil through deck manifold connections to tank storage facilities at a marine oil terminal. The plurality of pumps 58 take suction from the ship's cargo-oil storage tanks through their individual cargo-tank service lines 67. Cargo oil enters tank service line 67 from members of the tank group served by the service line and flows through tank group cut-out valve 69. Cargo oil then normally flows through service line cut-out valve 68 into pump suction line 59 through pump suction valve 60. The cargo oil is accelerated by pump 58 and discharged into oil-filling and discharge line 72 through valves 73 and 79, from whence it is discharged from the tank vessel through deck manifold connections.

Where cargo oil is discharged in the immediately foregoing manner, individual members of the plurality of pumps 58 may discharge cargo oil from members of adjacent tank groups through adjacent tank service lines. This flow routing is effected by opening the appropriate cross-over branch cut-out valves 71 in service line cross-over branches 70 and closing the appropriate tank-group cut-out valves 69.

Sea-water ballast may be loaded into members of individual tank groups through their tank service lines 67 by the plurality of pumps 58. Sea-water may then enter either or both of the intake sea chests 66; and proceeds into the transverse suction main 63 through sea valves 65 and motor-driven valves 64. The ballast sea-water then passes into the pump suction branch 61 of the pump 58 in use, and through suction branch cut-out valve 62. The sea-water next enters pump suction line 59 through pump suction valve 60 and is accelerated by pump 58. The ballast sea-water is discharged from pump 58 and passes through pump bypass branch 74 and suction bypass 76 through valves 73, 75 and 77 respectively. The ballast sea-water then flows into tank service line 67, from whence it is distributed to members of a seletced tank group through service line cross-over branches 70 and valves 71 and 69.

At the conclusion of cargo oil discharging operations, the pumps 58 and their suction line piping would normally be flushed with sea-water which is discharged into empty cargo tanks for a short time before maneuvering operations are begun. The procedure would be similar to that described in the preceding paragraph for sea-water ballast loading by the pumps. The flushing operation prevents the discharge of oil contaminants into harbor waters following the completion of cargo-oil discharging operations.

Sea-water ballast may also be loaded into the members of individual tank groups through their service lines by gravitation. According to this procedure, sea-water ballast enters either or both intake sea chests 66 and passes into transverse suction main 63 through sea valves 65 and motor-driven valves 64. The sea-water next flows into the selected pump suction branch 61 through suction branch cut-out valve 62 and into tank service line 67 through service line cut-out valve 68. The ballast sea-water is then distributed to individual members of a selected tank group through the operation of valves 71 and 69 as previously described.

Ballast overboard discharge branches 52, connecting to the transverse sea-water discharge main 51 of the maneuvering system, are terminated in ballast overboard discharge flanges 55 which are suitably affixed to the shell of the tank vessel. Sea-water ballast may be discharged from the vessel's cargo tanks by the pumps 58 acting singly or in combination. From members of the selected tank group, sea-water ballast flows into tank service line 67 and into pump suction line 59 through valves 62 and 60 respectively. The sea-water ballast is discharged by the pump 58 into sea-water discharge branch 56 through valve 57. Flow then proceeds into either or both ballast overboard discharge branches 52, and is discharged overboard through the discharge flanges 55 after passing through valves 53 and check valves 54. The valves of the maneuvering system which are not associated with de-ballasting operations are normally closed at this time.

The multi-purpose piping and maneuvering system illustrated in FIG. 7 would normally be associated with one end of the cargo-tank mid-body section of a tank vessel, while a similar piping and maneuvering system would be arranged at the opposite end. This arrangement may be highly advantageous since the cargo piping system would be of shorter length than conventional cargo piping systems according to which all pumps are at the after end of the cargo-tank mid-body. The savings in pipe lengths would be accompanied by a corresponding decrease in losses of fluid friction energy within the cargo piping system.

FIG. 8 is a line isometric schematic diagram which illustrates a saline-conversion type of power plant in simplified form, as would be capable of continuously supplying pressurized motive steam to the reversible ejector structure for propulsion purposes. A saline-conversion type of steam power plant is defined as a marine power plant which receives raw feed water from the waters in which the vessel navigates, and evaporates the raw feed water to steam while rejecting salts and other impurities therefrom. In this embodiment, raw feed water enters the intake sea chest at the lower right-hand corner of the drawing and is discharged into the ejector structure as motive steam through the motive nozzle at the upper left-hand corner of the drawing. When suction flow within conduit or channel 15 proceeds to the left and into the drawing as indicated, raw feed water and stream flow within the respective piping branches proceeds in the directions indicated by the exterior arrows.

Raw feed water enters intake sea chest 92 and passes into the open branch of transverse suction ma'n 89 through sea valve 91 and motor-driven valve 90. The raw feed water then flows into pump suction line 87 through suction valve 88. The raw feed water is accelerated and pressurized by feed water pump 86, and passes into pump discharge line 84 through discharge valve 85. The pressurized raw feed water is next supplied to saline evaporator 83.

Saline evaporator 83 receives heat energy from liquid metals heat exchanger or other appropriate heat source 98. Liquid metals heat exchanger 98 may in turn be supplied from a second appropriate heat source, such as a nuclear reactor. Heat energy is rapidly transferred from liquid metals heat exchanger 98 to saline evaporator 83 in a forced convection process by circulating pump 101. Circulating pump 101 receives cooled liquid metals from the internal heat transfer processes of saline evaporator 83 through circulating suction line 102 and suction valve 103. Then pressurized liquid metal are discharged by circulating pump 101 into circulating discharge line 99 through discharge valve 100, and supplied to the internal heating processes of liquid metals heat exchanger 98. High-temperature liquid metals flow from the internal heating processes of heat exchanger 98 through circulating supply line 97 to the internal heat transfer processes of saline evaporator 83. Cooled liquid metals flow from the internal heat transfer processes of saline evaporator 83 into circulating suction line 102, and the heat transfer cycle is repeated. Salts and other impurities are discharged from the internal processes of saline evaporator 83 into overboard discharge line 93 through valve 94 and check valve 95. The rejected salts and impurities are then discharged overboard through bottom flange fitting 96.

Pressurized steam as discharged from saline evaporator 83 into steam supply main 80 may be either saturated or superheated, depending upon the heat transfer processes associated with saline evaporator 83. The pressurized steam passes into steam supply main 80 through motor-driven stop valve 82 and optional desuperheater control unit 81. The motive steam then passes into the open motive-nozzle supply branch 32 through motor-driven nozzle-supply throttle valve 34 and sea valve 33, and passes on into nozzle supply pipe 29 through concentric line reducer 31.

It should be understood that the line isometric schematic diagram of FIG. 8 is considerably simplified, and that many pieces of supporting and control equipment not shown would also be a necessary part of the overall saline-conversion power plant system.

FIG. 9 is a schematic diagram of a hydraulic-jet maneuvering system application wherein a separate fluid pump and motive-fluid piping system is disposed to actuate each of the separate motive-nozzle supply pipes 29 of FIG. 1. According to this embodiment with flow proceeding from left-to-right within conduit or channel 15 as indicated, the right-hand fluid pump and motive-fluid piping system would be in use while the left-hand fluid pump and motive fluid piping system would be idle. Alternately flow will proceed from right-to-left within conduit for channel 15 when the left-hand fluid pump and motive-fluid piping system is in use, and the right-hand fluid pump and motive-fluid piping system is idle.

Motive fluid enters the actuating motive-fluid piping system of FIG. 9 through its intake 111, the same disposed to receive flow from the same direction as that from which suction fluid may enter and flow within conduit or channel 15. Motive fluid enters pump suction line 108 from intake 111, and passes to the pump suction through sea valve 110 and motor-driven vave 109. The motive fluid is accelerated by pump 107, and passes into pump discharge line 104 having motor-driven throttle valve 106 and sea valve 105 disposed as shown. Pump discharge line 104 communicates with concentric line reducer 31 and individual nozzle-supply pipe 29 as discussed earlier.

The motive-fluid discharge of pump 107 may alternately be diverted into overboard discharge line 112, when it is desired to operate pump 107 on a standby basis without exerting lateral thrust on the vessel. The motive-fluid discharge of pump 107 then enters overboard discharge line 112, and passes through motor-driven valve 113, check valve 114 and overboard discharge flange 115. Overboard discharge flange 115 is secured to hull plating of the vessel, and is disposed to discharge the motive-fluid output of pump 107 in a downward direction so that a lateral thrust is not exerted on the vessel. During this latter operation, motor-driven throttle valve 106 would normally be closed while motor-driven valve 113 would be open.

It is also evident that overboard discharge line 112 may be equipped to act as a pressure relief line for pump 107 during throttling operations. This arrangement would facilitate the use of a constant-speed centrifugal pump as fluid actuator for the motive-fluid piping system.

FIG. 10 is a line isometric schematic diagram illustrating a pulse-jet propulsation system in simplified form which is actuated by a plurality of steam-operated displacement cylinders 120. In this embodiment, motive sea water enters the intake sea chest 133 at the lower right-hand corner of the drawing and flows into the low-pressure or vacuum space 135 of the open right-hand displacement cylinder 120. High-pressure steam ejects the sea water column from the middle displacement cylinder 120 through open discharge line 117. Spent low-pressure steam is condensed within the closed left-hand displacement cylinder 120 by cooling water jet spray 134. When suction flow within conduit or channel 15 proceeds to the left and into the drawing as indicated, the motive nozzle supply pipe 29 at the upper left-hand corner of the drawing would receive separate surges of pressurized motive fluid as it received the successive discharges of displacement cylinders 120. Fluid flow within the various piping system branches of the pulse-jet propulsion system would normally proceed in the directions indicated by the exterior arrows.

As shown in FIG. 10, motive sea water enters the right-hand intake sea chest 133 and flows into transverse suction main 130 through sea valve 132 and motor-driven valve 131. The plurality of suction intake branches 124 leading to the plurality of steam-operated displacement cylinders 120 are connected in parallel and separately communicate with common transverse suction main 130. Where motive flow proceeds in the directions shown by the exterior arrows, the near sea valve 132 and motor-driven valve 131 in transverse suction main 130 would be open, while the far alternate sea valve 132 and motor-driven valve 131 would be closed.

Motive sea water flows from transverse suction main 130 into intake branch 124 of the right-hand displacement cylinder 120 through open valve 125 and check valve 126. The motive sea water flows into low-pressure or vacuum space 135 of right-hand displacement cylinder 120 past closed cylinder discharge valve 119.

The middle displacement cylinder 120 is supplied with high-pressure steam from any suitable steam generator or steam source, such as the saline conversion steam generator shown in connection with FIG. 8. High-pressure steam enters the middle displacement cylinder 120 from steam supply main 123 through steam supply branch 121 and supply valve 122. The high-pressure steam acts on the surface of the water column in the middle displacement cylinder to eject the sea water therefrom through cylinder discharge line 117, open discharge valve 119 and check valve 118. The pressurized contents of the middle displacement cylinder are shown as being discharged into the common discharge main 116 past closed overboard discharge valve 137. Pressurized motive-fluid flow then proceeds from transverse discharge main 116 into the left-hand nozzle supply branch 32 through open motor-driven throttle valve 34 and sea valve 33. From nozzle supply branch 32, the motive sea water passes through concentric line reducer section 31 into nozzle supply pipe 29 of the reversible ejector structure.

Spent low-pressure steam is being condensed in the left-hand displacement cylinder 120 by cooling water jet spray 134. Left-hand displacement cylinder 120 is isolated from the middle and right-hand displacement cylinders 120 by closed steam supply valve 122, closed sea water intake valve 125 and closed cylinder discharge valve 119. Pressurized cooling water from any suitable pumping source enters the left-hand displacement cylinder 120 from cooling water supply main 129 through cooling water supply branch 127 and supply valve 128. Each displacement cylinder 120 has mounted within a suitable jet-spray attachment connected to and supplied from cooling water supply branch 127. The jet-spray attachment mounted in each of displacement cylinders 120 may be any of several devices common to the jet condenser arts. Cooling water jet spray 134 causes the spent low-pressure steam in the left-hand displacement cylinder 120 to condense through contact heat exchange, thereby causing a low-pressure or vacuum space 135 to form within the displacement cylinder. The low-pressure or vacuum space 135 in the displacement cylinder 120 allows the cylinder to be rapidly filled by low-pressure motive fluids under the effects of atmospheric pressure.

Check valve 118 in cylinder discharge line 117 prevents a pressure load on discharge valve 119 or the reverse flow of pressurized motive fluids into displacement cylinder 120 during filling or condensing operations. Check valve 126 in filling branch 124 prevents a pressure load on filling valve 125 or the discharge of pressurized motive fluids through filling branch 124 during cylinder discharge operations.

Cooling water supply valves 128, sea water inlet valves 125, steam supply valves 122 and cylinder discharge valves 119 attached to the right-hand, middle and left-hand displacement cylinder piping may each be combined in separate distributing valves 128, 125, 122 and 119. The right-hand, middle and left-hand displacement cylinders 120 could then easily conduct combined filling, discharge and condensing operations as illustrated in FIG. 10. In such a refinement cooling water distributing valve 128, sea water inlet distributing valve 125, steam supply distributing valve 122 and cylinder discharge distributing valve 119 would have their operations sequentially controlled.

The motive-fluid discharge of displacement cylinders 120 may alternately be diverted into overboard discharge line 136, when it is desired to operate the pulse-jet propulsion system on a test or standby basis without exerting propulsive thrusts on the vessel. The motive-fluid discharge of displacement cylinders 120 then enters overboard discharge line 136 and passes through discharge valve 137, check valve 138 and overboard discharge flange 139. Overboard discharge flange 139 is secured to hull plating of the vessel, and is disposed to discharge motive fluids downwardly so that no propulsive thrusts are exerted on the vessel. During the latter operation, motor-driven throttle valves 34 would normally be closed and overboard discharge valve 137 would be open.

It should be realized that the pulse-jet propulsion system disclosed in connection with FIG. 10 may be applicable to either maneuvering system or main propulsion system applications.

FIG. 11 is a line isometric schematic diagram wherein a separate saline conversion type of steam power plant may be alternately actuated to supply pressurized motive steam to either of the separate motive-nozzle supply pipes 29 of the FIG. 1 embodiment. In the embodiment of FIG. 11 when suction flow proceeds from right-to-left within conduit or channel 15 as shown, the left-hand saline conversion power plant would supply pressurized motive steam to the left-hand motive-nozzle supply pipe 29 while the right-hand saline conversion steam power plant system would be idle. Alternately flow would proceed from left-to-right within conduit or channel 15 when the right-hand saline conversion steam power plant system is actively used and the corresponding left-hand saline conversion steam power plant system is idle.

Each saline conversion steam power plant system shown in the embodiment of FIG. 11 functions similarly to the saline conversion steam power plant system disclosed earlier in connection with FIG. 9. Raw feed water enters intake sea chest 150 of the active steam system and passes into pump suction line 148 through sea valve 149. The entering feed water is accelerated and pressurized by feed water pump 147, and passes into pump discharge line 145 through discharge valve 146. The pressurized raw feed water is then supplied to saline evaporator 144.

Saline evaporator 144 receives heat energy from liquid metals heat exchanger 156 by means of the forced convection circulating system 155 and 157–161, which functions similarly to the forced convection circulating system described in connection with FIG. 9. Saline evaporator 144 rejects salts and other impurities through overboard discharge line 151, valve 152, check valve 153 and bottom discharge flange 154.

Each saline evaporator 144 discharges pressurized steam into its respective steam supply main 140 when propelling the vessel. The pressurized steam flows through motor-driven stop valve 143, motor-driven throttle valve 142 and sea valve 141, and passes into motive-nozzle supply pipe 29 through concentric line reducer 31 as shown.

It should be noted that raw feed water enters intake sea chest 150 of the left-hand steam power plant system from the direction of positive differential pressure when the vessel is being propelled from left-to-right as shown in FIG. 11. When the alternate right-hand steam power plant system propels the vessel from right-to-left, raw feed water would enter the far intake sea chest 150 from the direction of positive differential pressure.

FIG. 12 is a line isometric schematic diagram wherein a saline conversion power plant or other steam source may alternately supply pressurized steam to multiple displacement cylinders of separate pulse-jet systems discharging to the separate motive-nozzle supply pipes 29 of the FIG. 1 embodiment. In the embodiment of FIG. 12 as suction flow proceeds from right-to-left within conduit or channel 15, steam-actuated displacement cylinders 166 of the left-hand pulse-jet system supply pressurized motive fluids to the left-hand motive-nozzle supply pipe 29 while the alternate right-hand pulse-jet system and nozzle supply pipe 29 is idle. Suction flow within conduit or channel 15 may alternately proceed from left-to-right out of the drawing when displacement cylinders 166 of the right-hand pulse-jet system are actuated by high-pressure steam and discharge to the near right-hand nozzle supply pipe 29 while the corresponding left-hand pulse-jet system is idle.

In the embodiment of FIG. 12, motive sea water enters intake sea chest 181 in the center foreground, and gravitates into the low-pressure space of the far displacement cylinder 166 in the active left-hand pulse-jet system. Within this far left-hand displacement cylinder 166, combined operations take place which include the condensing of spent steam by cooling water jet spray 182 and filling of the displacement cylinder by motive sea water from supply main 178. Simultaneously with the foregoing filling and condensing operation, high-pressure steam discharges motive sea water from near displacement cylinder 166 of the active left-hand pulse-jet system through communicating discharge piping into the far left-hand motive-nozzle supply pipe 29 of the conduit or channel 15 ejector structure. Within the various piping system branches of FIG. 12, fluid flow proceeds in the directions indicated by the exterior arrows.

Motive sea water enters intake sea chest 181 in the center foreground, and flows into suction main 178 through sea valve 180 and motor-driven valve 179. Motive sea water flows past closed filling valve 173 of the near displacement cylinder into suction intake branch 172 of the far displacement cylinder 166 through filling valve 173 and check valve 174. Motive sea water then fills the far displacement cylinder 166 while discharge valve 165 is closed and condensing cooling water enters from supply main 177 through supply branch 175 and supply valve 176. A suitable jet-spray attachment supplied from water supply branch 175 discharges cooling water jet spray 182 into the far displacement cylinder 166 to condense spent steam.

The near displacement cylinder 166 of the left-hand pulse-jet system is being simultaneously supplied with high-pressure steam from any suitable steam generator or source, such as the saline conversion steam generator disclosed in connection with the embodiment of FIG. 8. High-pressure steam from steam supply main 171 flows past closed motor-driven valve 170 of branch steam supply header 169 for the idle right-hand pulse-jet system into branch steam supply header 169 and through open motor-driven valve 170 of the the active left-hand pulse-jet system. The high-pressure steam enters near displacement cylinder 166 through steam supply branch 167 and open supply valve 168 to discharge the motive sea water therefrom. During this motive-fluid discharging operation, cooling water supply valve 176 and filling check valve 174 are closed. The high-pressure motive fluid flows into discharge line 163 through discharge valve 165 and check valve 164. The high-pressure motive fluid next flows into discharge header 162 and into nozzle supply branch 32 past the closed discharge valve 184 of overboard discharge line 183. The high-pressure motive fluid then flows through motor-driven throttle valve 34 and sea valve 33 of nozzle supply branch 32, and through concentric line reducer section 31 into motive-nozzle supply pipe 29 of the conduit or channel 15 ejector structure.

Each pulse-jet system in the illustrative embodiment of FIG. 12 has a vertically disposed overboard discharge line 183 communicating with its respective motive-fluid discharge header 162. Pressurized motive fluids may then be alternately discharged from discharge header 162 into overboard discharge line 183 through discharge valve 184, check valve 185 and thence downwards through bottom discharge flange 186. This arrangement permits standby operation of the selected pulse-jet system without exerting propulsive thrusts on the vessel.

It should be noted that motive sea water enters near intake sea chest 181 of the left-hand pulse-jet system from the direction of positive differential pressure when the vessel is being propelled from left-to-right out of the drawing as shown in FIG. 12. When the alternate right-hand pulse-jet system propels the vessel from right-to-left into the drawing, motive sea water would enter the far intake sea chest 181 of the right-hand pulse-jet system from the direction of positive differential pressure.

From the foregoing, it will be seen that the teachings of the present invention provide means of effecting the turning and lateral propulsion of a marine vessel in several variations which is capable of accurately controlling vessel movements, and which is applicable to the forward and reverse propulsion of a marine vessel. The provision of transverse propulsion tube described herein, together with the several motive fluid piping systems, enables a vessel to be propelled in directions lateral to its keel, and to turn in a short space about a vertical axis in any direction without having any steerageway on the vessel. These features are extremely useful in docking operations or in-port maneuvering, and enables the vessel to proceed without the assistance of harbor tugboats.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A marine propelling device comprising a reversible ejector structure arranged within the hull of a marine vessel and having its ends disposed below the normal waterline whereby water may pass from one propelling end to the other of said reversible ejector structure, said reversible ejector structure being bounded by the sidewalls of a conduit secured to hull portions of said marine vessel; an oppositely-directed pair of thrust-augmenting secondary-nozzle ejector stagings centrally disposed with respect to said conduit and the propelling axis of said reversible ejector structure; each ejector staging being disposed to discharge out of the respectively adjacent propelling end of said reversible ejector structure; each ejector staging having a central motive nozzle disposed to supply high-velocity motive fluids into the central bore of at least one adjacent secondary nozzle member; each of said secondary-nozzle members having a substantial frusto-conical shape and disposed in tandem with respect to any other adjacently disposed secondary-nozzle member so the fluid discharge of one of said secondary-nozzle members entrains additional suction fluid into the inlet of an adjacent downstream companion secondary-nozzle member from the central fluid passage of said reversible ejector structure; the exterior frusto-conical surfaces of each of said secondary-nozzle members being disposed with respect to the bounding sidewalls of said conduit as to define a peripheral nozzle passageway for the acceleration of suction fluids entering said reversible ejector structure past the configuration of the inactive ejector staging impelled by the pumping capacity of the alternate active ejector staging; whereby suction fluids may be reversibly accelerated in either propelling direction to develop thrust at both the inlet and discharge ends of said reversible ejector structure; a source of pressurized motive fluid; and supply conduits establishing communication between the said source of pressurized motive fluid and each of the said motive nozzles of the oppositely-directed secondary-nozzle ejector stagings; the entire assemblage comprising a reversible jet-reaction ejector structure.

2. The reversible, jet-reaction ejector structure for marine propulsion of claim 1 wherein fluid flow spaces between the walls of the ejector passage and the surfaces of any of the individual secondary-nozzle members and/or fluid flow spaces between adjacent secondary-nozzle members comprise annular nozzle passages, each nozzle passage providing for the incorporation of pinch-jet accelerating effects on the intake of suction fluids past the configuration of the inactive ejector staging and into said ejector passage, when the ejector structure has been activated by the injection of high-velocity motive fluids into the opposite ejector staging.

3. The reversible, jet-reaction ejector structure for marine propulsion of claim 1 wherein the aforesaid nozzle supply pipes extend through the bounding sidewalls of said ejector structure; and means for supplying pressurized motive fluids thereto from within the vessel.

4. The reversible, jet-reaction ejector structure for maine propulsion of claim 1 wherein a fluid pump is disposed to supply pressurized motive fluids through communicating means into each nozzle supply pipe.

5. The reversible, jet-reaction ejector structure for marine propulsion of claim 1 wherein a fluid pump is disposed to supply pressurized motive fluids into a discharge main communicating with each of the aforesaid nozzle supply pipes; and valve diversion means set into the said discharge main leading to each of the nozzle supply pipes whereby output of the pump may be alternately diverted into either motive nozzle supply pipe.

6. The reversible, jet-reaction ejection structure for marine propulsion of claim 1 wherein a fluid pump is disposed to supply pressurized motive fluids through communicating means into each nozzle supply pipe; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; and communicating means from each of the aforesaid intakes to the suction of the pump.

7. The reversible, jet-reaction ejector structure for marine propulsion of claim 1 wherein a fluid pump is disposed to supply pressurized motive fluids through communicating means into each nozzle supply pipe; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; a pump suction main communicating with each of the aforesaid suction intakes and with the suction of said fluid pump; and valve diversion means set into the said suction main leading from each of the suction intakes whereby pump suction fluids may be alternately supplied to the pump from either intake.

8. The reversible, jet-reaction ejector structure for marine propulsion of claim 1 wherein a fluid pump is disposed to supply pressurized motive fluids into a discharge main communicating with each of the aforesaid nozzle supply pipes; valve diversion means set into the said discharge main leading to each of the nozzle supply pipes whereby output of the pump may be alternately diverted into either motive nozzle supply pipe; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; a pump suction main communicating with each of the aforesaid suction intakes and with the suction of said fluid pump; and valve diversion means set into the said suction main leading from each of the suction intakes whereby pump suction fluids may be alternately supplied to the pump from either intake.

9. The reversible, jet-reaction ejector structure for marine propulsion of claim 1 wherein a plurality of fluid pumps are disposed in parallel to supply pressurized motive fluids into a common discharge main communicating with each of the aforesaid nozzle supply pipes; valve diversion means set into the said discharge main leading to each of the nozzle supply pipes whereby output of the said plurality of pumps may be alternately diverted into either motive nozzle supply pipe; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; a pump suction main communicating with each of the aforesaid suction intakes and with the suctions of the said plurality of fluid pumps; and valve diversion means set into the said suction main leading from each of the suction intakes whereby pump suction fluids may be alternately supplied to the said plurality of fluid pumps from either intake.

10. The reversible, jet-reaction ejector structure for marine propulsion of claim 1 wherein a fluid pump is disposed to supply pressurized motive fluids through communicating means into each nozzle supply pipe; and motive-fluid throttle valves set into each nozzle supply pipe whereby the quantity of velocity of motive fluids discharged by said motive-jet injection nozzles may be regulated, thereby regulating the quantity and velocity of total discharge from said jet-reaction ejector structure.

11. The reversible, jet-reaction ejector structure for marine propulsion of claim 1 wherein a fluid pump is disposed to supply pressurized motive fluids into a discharge main communicating with each of the aforesaid nozzle supply pipes; valve diversion means set into said discharge main leading to each of the nozzle supply pipes whereby output of the pump may be alternately diverted into either motive-nozzle supply pipe; and motive-fluid throttle valves set into each nozzle supply pipe whereby the quantity and velocity of motive fluids discharged by said motive-jet injection nozzles may be regulated, thereby regulating the quantity and velocity of total discharge from said jet-reaction ejector structure.

12. The reversible, jet-reaction ejector structure for marine propulsion of claim 1 wherein a steam generator is disposed to supply pressurized motive steam through communicating means into each nozzle supply pipe.

13. The reversible, jet-reaction ejector structure for marine propulsion of claim 1 wherein a steam generator is disposed to supply pressurized motive steam into a discharge main communicating with each of the aforesaid nozzle supply pipes; and valve diversion means set into the said discharge main leading to each of the nozzle supply pipes whereby motive steam supplied by the aforesaid steam generator may be alternately diverted into either motive nozzle supply pipe.

14. The reversible, jet-reaction ejector structure for marine propulsion of claim 1 wherein a steam generator is disposed to supply pressurized motive steam through communicating means into each nozzle supply pipe; fluid pumps for supplying pressurized feed water to the evaporative processes of said steam generator; communicating means from the discharge of said fluid pumps to the feed water inlet of said steam generator; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; and communicating means from each of the aforesaid intakes to the suction of said fluid pumps.

15. The reversible, jet-reaction ejector structure for marine propulsion of claim 1 wherein a steam generator is disposed to supply pressurized motive steam through communicating means into each nozzle supply pipe; fluid pumps for supplying pressurized feed water to the evaporative processes of said steam generator; communicating means from the discharge of said fluid pumps to the feed water inlet of said steam generator; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; a pump suction main communicating with each of the aforesaid suction intakes and with the suctions of the said fluid pumps; and valve diversion means set into the said suction main leading from each of the suction intakes whereby pump suction fluids may be alternately supplied to the said fluid pumps from either intake.

16. The reversible, jet-reaction ejector structure for marine propulsion of claim 1 wherein a steam generator is disposed to supply pressurized motive steam into a discharge main communicating with each of the aforesaid nozzle supply pipes; valve diversion means set into the said discharge main leading to each of the nozzle supply pipes whereby motive steam supplied by the said steam generator may be alternately diverted into either motive nozzle supply pipe; fluid pumps for supplying pressurized feed water to the evaporative processes of said steam generator member; communicating means from the discharge of said fluid pumps to the feed water inlet of said steam generator; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; a pump suction main communicating with each of the aforesaid suction intakes and with the suctions of the said fluid pumps; and valve diversion means set into the said suction main leading from each of the suction intakes whereby pump suction fluids may be alternately supplied to the said fluid pumps from either intake.

17. The reversible, jet-reaction ejector structure for marine propulsion of claim 1 wherein a steam generator is disposed to supply pressurized motive steam through communicating means into each nozzle supply pipe; and motive-steam throttle valves set into each nozzle supply pipe branch whereby the quantity and velocity of motive steam discharged by said motive-jet injection nozzles may be regulated, thereby regulating the quantity and velocity of total discharge from said jet-reaction ejector structure.

18. The reversible, jet-reaction ejector structure for marine propulsion of claim 1 wherein a steam generator is disposed to supply pressurized motive steam into a discharge main communicating with each of the aforesaid nozzle supply pipes; communicating means from said steam generator to the aforesaid discharge main; desuperheater control means upstream of said discharge main for limiting the pressure and temperature of motive steam supplied thereto by said steam generator member; valve diversion means set into the said discharge main leading to each of the nozzle supply pipes whereby motive steam supplied by the steam generator may be alternatively diverted into either motive nozzle supply pipe; and motive steam throttle valves set into each nozzle supply pipe branch whereby the quantity and velocity of motive steam discharged by said motive-jet injection nozzles may be regulated, thereby regulating the quantity and velocity of total discharge from said jet-reaction ejector structure.

19. A reversible fluid damping apparatus for marine applications comprising an ejector structure arranged within the hull of a marine vessel and having its ends disposed below water whereby water may pass freely from one end to the other of said ejector structure, said ejector structure bounded by the sidewalls of a conduit or channel secured to the hull structure of said marine vessel; an oppositely-directed pair of secondary-nozzle stagings centrally disposed within said ejector structure, each staging having members of substantially frusto-conical shape arranged in tandem with respect to each other and disposed to act successively on fluids passing through the staging; an ejector passage disposed centrally of said ejector structure comprising nozzle passageways defined by said bounding conduit or channel walls together with the surfaces of said oppositely-disposed secondary-nozzle staging members of said ejector structure; whereby the relative kinetic energy of fluids passing through the ejector structure may be substantially dissipated in nozzle passageways thereof by fluid friction, the entire ejector structure serving as a reversible fluid brake or sea anchor that tends to reversibly dampen motion of the marine vessel.

20. The reversible, jet-reaction ejector structure for marine propulsion of claim 1 wherein an individual fluid pump is disposed to separately supply pressurized motive fluids through communicating means to each nozzle supply pipe.

21. The reversible, jet-reaction ejector structure for marine propulsion of claim 1 wherein an individual fluid pump is disposed to separately supply pressurized motive fluids through communicating means to each nozzle supply pipe; oppositely-directed pump suction intakes axially disposed in a parallel horizontal plane with the reversible axis of said ejector structure so that alternate intakes may receive pump suction fluids from alternate directions similar to that from which suction fluids may enter said ejector structure; and communicating means from each of the aforesaid intakes to the suction of its individual companion fluid pump.

22. The reversible, jet-reaction ejector structure for marine propulsion of claim 1 wherein an individual fluid pump is disposed to separately supply pressurized motive fluids through communicating means to each nozzle supply pipe; and an individual motive-fluid throttle valve set into each nozzle supply line whereby the quantity and velocity of motive fluids discharged by its respective motive-jet injection nozzle may be regulated, thereby regulating the quantity and velocity of total discharge from said jet-reaction ejector structure.

23. A reversible, jet-reaction ejector structure for marine propulsion comprising an ejector passage arranged within the hull of the ship and having its ends disposed below the normal water line whereby water may pass freely from one end to the other of said ejector passage; an opposed pair of thrust-augmenting secondary-nozzle stagings having individual members of substantially frusto-conical shape and concentrically mounted with respect to each other and the walls of said ejector passage, the enlarged openings of said secondary-nozzle staging members being directed towards the opposite end of the ejector passage; an opposed pair of motive-fluid injection nozzles and attached supply pipes whose discharge orifices are directed along the concentric axis of and into the thrust-augmenting secondary-nozzle stagings; a liquid pump supplying pressurized motive fluid selectively into the supply pipes of the motive-jet injection nozzles; a longitudinally extending multi-branch pump suction line axially disposed in parallel with the longitudinal axis of said ejector passage, the suction of said liquid pump being disposed so as to communicate selectively with either of the alternate branches of said parallel suction line; and valve diversion means in the motive-fluid suction line of the pump which may alternately transfer the motive fluid input to the pump from either branch of the said longitudinally extending motive-fluid suction line.

24. A ship-propelling device comprising an ejector passage arranged within the hull of the ship and having its ends disposed below the normal water line whereby water may pass freely from one end to the other of said passage, an opposed pair of thrust-augmenting, secondary-nozzle stagings having members of substantially frusto-conical shape but having either convergent or convergent-divergent configuration and concentrically mounted with respect to each secondary-nozzle member and with respect to said ejector passage, and having the smaller ends of the individual secondary-nozzle members directed out of said passage in opposite directions; and an opposed pair of motive-jet nozzles concentrically mounted with respect to the ejector passage and with respect to the opposed secondary-nozzle stagings, with motive-jet nozzles disposed so as to be capable of injecting a high-velocity jet discharge along the concentric axis of the structure and into either of the opposed, augmenting, secondary-nozzle stagings, the entire structure comprising a reversible, ejector structure for marine propulsion.

25. A reversible, jet-reaction structure for marine propulsion comprising an ejector passage arranged within the hull of the ship and having its ends disposed below the normal water line whereby water may pass freely from one end to the other of said passage, an opposed pair of thrust-augmenting secondary-nozzle stagings having members of substantially frusto-conical shape and concentrically mounted with respect to companion members and the said ejector passage, and having clearances between the enlarged ends of the individual secondary-nozzle members and the walls of the ejector passage so spaced as to provide for the incorporation of pinch-jet accelerating effects on the intake of suction fluid past the configuration of the inactive staging, and into the confines of said ejector passage, when the ejector structure has been activated by the injection of high-velocity motive fluid into the opposite staging.

26. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having members of substantial frusto-conical shape and concentrically mounted with respect to companion members and said ejector passage, with the convergent entrances of individual secondary-nozzle members serving to act as a fluid brake or sea anchor that tends to slow the movement of section fluid past its configuration and to retard the axial movement of the ship when the jet-reaction ejector structure is idle.

27. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to companion members and said ejector passage, whose position and configuration shall be such as to offer minimum resistance to the flow of suction fluid within the passage when one augmenting secondary-nozzle stage is activated, and which will offer maximum resistance to the flow of suction fluid within the ejector passage when the ejector structure is inactive.

28. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to companion members and the walls of said ejector passage, each individual secondary-nozzle member of a staging having convergent entrances which increase in diameter towards the opposite end of the ejector passage, with the enlarged entrance of each individual secondary-nozzle member being of less external transverse dimension than an adjacent secondary-nozzle member or the walls of the ejector passage to provide restricted flow spaces between the components of the ejector structure, an opposed pair of motive-fluid injection nozzles which may discharge selectively along the concentric axis of and into either of the opposed, secondary-nozzle stagings, and to which is attached separate supply pipes and a means of supplying motive fluid at controlled flow rates and pressures.

29. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to each other and the walls of said ejector passage, the enlarged openings of said secondary-nozzle stagings being directed towards the opposite end of the ejector passage, an opposed pair of motive fluid injection nozzles and attached supply pipes whose discharge ends are directed along the concentric axis of the ejector passage and into the thrust-augmenting secondary-nozzle stagings, a liquid pump supplying pressurized motive fluid to the supply pipe of the motive-jet injection nozzles, and valve diversion means in the discharge line of the pump which may alternately transfer the fluid output of the pump into either of the motive-fluid supply pipes.

30. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to each other and the walls of said ejector passage, the enlarged openings of said secondary-nozzle stagings being directed towards the opposite end of the ejector passage, an opposed pair of motive-fluid injection nozzles and attached supply pipes whose discharge ends are directed along the concentric axis of the ejector passage and into the thrust-augmenting secondary-nozzle stagings, a liquid pump supplying pressurized motive fluid selectively into the supply pipes of the motive-jet injection nozzles, a divided pump suction main arranged to provide alternate fluid branches for the intake of motive fluids into the suction of said liquid pump, and valve diversion means in the pump suction main which may alternately route motive fluids to the pump from either branch of the said pump suction main.

31. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to each other and the walls of said ejector passage, the enlarged openings of said secondary-nozzle stagings being directed towards the opposite end of the ejector passage, an opposed pair of motive-fluid injection nozzles and attached supply pipes whose discharge ends are directed along the concentric axis of the ejector passage and into the thrust-augmenting secondary-nozzle stagings, a liquid pump supplying pressurized motive fluid to the supply pipe of the motive-jet injection nozzles; an oppositely directed pair of motive-fluid suction intakes which are connected to alternate branches of a divided pump suction line, said suction intakes being directed towards adjacent ends of said ejector passage so that motive fluid may enter the opening of said suction intakes from the same direction as that in which suction flow may enter and proceed in said ejector passage, and valve diversion means in the motive-fluid suction line of the pump which may alternately transfer the motive fluid input to the pump from either branch of the motive-fluid pump suction lines.

32. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to each other and the walls of said ejector passage, the enlarged openings of said secondary-nozzle stagings being directed towards the opposite end of the ejector passage, an opposed pair of motive-fluid injection nozzles and attached supply pipes whose discharge ends are directed along the concentric axis of the ejector passage and into the thrust-augmenting secondary-nozzle staging, a liquid pump supplying pressurized motive fluid to the supply pipes of the motive-jet injection nozzles; valve diversion means in the motive-fluid suction line of the pump which may alternately transfer the motive-fluid input to the pump from either branch of the motive-fluid suction line, valve diversion means in the discharge line of the pump which may alternately transfer the fluid output of the pump into either of the motive-fluid nozzle supply pipes, and a connecting means, between the valve diversion means in the suction line of the pump and the valve diversion means in the discharge line of the pump which will cause said valve diversion means to assume alternate open or closed positions with respect to each other when either valve diversion means is independently operated.

33. A reversible, jet-reaction, ejector structure for marine propulsion comprising an ejector passage arranged within the sull of the ship and having its ends disposed below the normal water line whereby water may pass freely from one end to the other of said ejector passage, an opposed pair of thrust-augmenting secondary-nozzle, stagings having individual members of substantially frusto-conical shape and concentrically mounted with respect to each other and the walls of said ejector passage, the enlarged openings of said secondary-nozzle stagings being directed towards the opposite end of the ejector passage, an opposed pair of motive-fluid injection nozzles and attached supply pipes whose discharge ends are directed along the concentric axis of the ejector passage and into the thrust-augmenting secondary-nozzle stagings, a liquid pump supplying pressurized motive fluid to the supply pipes of the motive-jet injection nozzles; valve diversion means in the motive-fluid suction line of the pump which may alternately transfer the motive fluid input to the pump from either branch of the motive-fluid suction line, valve diversion means in the discharge line of the pump which may alternately transfer the fluid output of the pump into either of the motive-fluid nozzle supply pipes, and motive-fluid nozzle supply pipe throttle valves which are set into each branch leading to the separate motive-jet injection nozzles; said motive-fluid throttle valves being used to regulate the quantity and velocity of motive-fluid which is discharged from said motive-fluid injection nozzles, thereby regulating the quantity and velocity of total discharge from said jet reaction ejector structure.

34. A reversible, jet-reaction, ejector structure for marine propulsion comprising an ejector passage arranged within the hull of the ship and having its ends disposed below the normal water line whereby water may pass freely from one end to the other of said ejector passage, an opposed pair of thrust-augmenting secondary-nozzle stagings having individual members of substantially frusto-conical shape and concentrically mounted with respect to each other and the walls of said ejector passage, the enlarged openings of said secondary-nozzle stagings being directed towards the opposite end of the ejector passage, an opposed pair of motive-fluid injection nozzles and attached supply pipes whose discharge ends are directed along the concentric axis of the ejector passage and into the thrust-augmenting secondary-nozzle stagings, a liquid pump supplying pressurized motive fluid to the supply pipes of the motive-jet injection nozzles; valve diversion means in the motive-fluid suction line of the pump which may alternately transfer the motive fluid input to the pump from either branch of the motive-fluid suction line, valve diversion means in the discharge line of the pump which may alternately transfer the fluid output of the pump into either of the motive-fluid nozzle supply pipes, and motive-fluid nozzle supply pipe throttle valves which are set into each branch leading to the separate motive-jet injection nozzles; said motive-fluid throttle valves being used to regulate the quantity and velocity of motive-fluid which is discharged from said motive-fluid injection nozzles, thereby regulating the quantity and velocity of total discharge from said jet-reaction ejector structure.

35. The reversible, jet-reaction ejector structure for marine propulsion of claim 1 wherein a displacement-type pressure vessel is disposed to selectively discharge pressurized motive fluids through communicating means into each motive-nozzle supply pipe; communicating means between the waters exterior to the marine vessel and the interior of said pressure vessel whereby said exterior waters may be selectively admitted thereinto; a source of high-pressure steam; and communicating means between the said source of high-pressure steam and the interior of said pressure vessel whereby the high-pressure steam may be selectively admitted thereinto to expand against and discharge said exterior waters from said pressure vessel through communicating means into a motive-nozzle supply pipe of said ejector structure.

36. The reversible, jet-reaction ejector structure for marine propulsion of claim 1 wherein a displacement-type pressure vessel is disposed to selectively discharge pressurized motive fluids through communicating means into each motive-nozzle supply pipe; communicating means between the waters exterior to the marine vessel and the interior of said pressure vessel whereby the said exterior waters may be selectively admitted thereinto; a source of high-pressure steam; communicating means between the said source of high-pressure steam and the interior of said pressure vessel whereby the high-pressure steam may be selectively admitted thereinto to expand against and discharge said exterior waters from said pressure vessel; a source of pressurized cooling water; jet-spray apparatus disposed within the interior of said pressure vessel; and communicating means between the said source of pressurized cooling water and the interior jet-spray apparatus of said pressure vessel whereby the said pressurized cooling water may be selectively discharged through the said jet-spray apparatus into the interior of said pressure vessel to condense low-pressure steam therewithin.

37. The reversible, jet-reaction ejector structure for marine propulsion of claim 1 wherein a displacement-type pressure vessel is disposed to selectively discharge pressurized motive fluids into fluid conduit communicating with each motive-nozzle supply pipe; valve diversion means in the said discharge conduit whereby the pressurized discharge of said pressure vessel may be alternately diverted into either nozzle supply pipe; a filling conduit communicating with waters exterior to the marine vessel and the interior of said pressure vessel; valve means in the filling conduit of said pressure vessel for regulating the admission of the said exterior waters thereinto; a source of high-pressure steam; steam supply conduit communicating with the said source of high-pressure steam and the interior of said pressure vessel; valve means in the steam supply conduit of said pressure vessel for regulating the admission of high-pressure steam thereinto to expand against and discharge said exterior waters therefrom; valve means in the discharge conduit of said pressure vessel for regulating the discharge of pressurized motive fluids therefrom; a source of pressurized cooling water; jet-spray apparatus disposed within the interior of said pressure vessel; cooling water conduit communicating with the said source of pressurized cooling water and the interior jet-spray apparatus of said pressure vessel; and valve means in said cooling water conduit for regulating the admission of condensing cooling water into the interior of said pressure vessel.

38. The reversible, jet-reaction ejector structure for marine propulsion of claim 1 wherein a displacement-type pressure vessel is disposed to selectively discharge pressurized motive fluids through communicating means into each motive-nozzle supply pipe; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; and communicating means from each of the said filling intakes to the interior of said pressure vessel whereby said exterior waters may be selectively admitted thereinto.

39. The reversible, jet-reaction ejector structure for marine propulsion of claim 1 wherein a displacement-type pressure vessel is disposed to selectively discharge pressurized motive fluids through communicating means into each motive-nozzle supply pipe; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; communicating means from each of the said filling intakes to the interior of said pressure vessel whereby the said exterior waters may be selectively admitted thereinto; a source of high-pressure steam; and communicating means between the said source of high-pressure steam and the interior of the said pressure vessel, whereby the high-pressure steam may be selectively admitted thereinto to expand against and discharge the said exterior waters from the said pressure vessel through communicating means into a motive-nozzle supply pipe of said ejector structure.

40. The reversible, jet-reaction ejector structure for marine propulsion of claim 1 wherein a displacement-type pressure vessel is disposed to selectively discharge pressurized motive fluids through communicating fluid conduit into each motive-nozzle supply pipe; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; fluid conduit communicating with each of the said filling intakes and the interior of said pressure vessel whereby said exterior waters may be selectively admitted thereinto; and valve diversion means in said fluid conduit whereby said exterior waters may alternately be admitted into said pressure vessel from either of the said filling intakes.

41. The reversible, jet-reaction ejector structure for marine propulsion of claim 1 wherein a displacement-type pressure vessel is disposed to selectively discharge pressurized motive fluids into a discharge main communicating with each of the said motive-nozzle supply pipes; valve diversion means set into the said motive-fluid discharge main whereby the pressurized discharge of the said pressure vessel may be alternately diverted into either motive-nozzle supply pipe; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; fluid conduit communicating with each of the said filling intakes and the interior of said pressure vessel whereby the said exterior waters may be selectively admitted thereinto; and valve diversion means in the said filling conduit whereby the said exterior waters may be alternately admitted into the said pressure vessel from either of the said filling intakes.

42. The reverible, jet-reaction ejector structure for marine propulsion of claim 1 wherein a displacement-type pressure vessel is disposed to selectively discharge pressurized motive fluids into a discharge main communicating with each of the said motive-nozzle supply pipes; valve diversion means set into the said motive-fluid discharge main whereby the pressurized discharge of said pressure vessel may be alternately diverted into either motive-nozzle supply pipe; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; fluid conduit communicating with each of the said filling intakes and the interior of said pressure vessel whereby said exterior waters may be admitted thereinto; valve diversion means in the said filling conduit whereby said exterior waters may be alternately admitted into said pressure vessel from either of the said filling intakes; valve means in the filling conduit of said pressure vessel for regulating the admission of exterior waters thereinto; a source of high-pressure steam; steam supply conduit communicating with the said source of high-pressure steam and the interior of said pressure vessel; valve means in the steam supply conduit of said pressure vessel for regulating the admission of high-pressure steam thereinto to expand against and discharge said exterior waters therefrom; valve means in the discharge conduit of said pressure vessel for regulating the discharge of pressurized motive fluids therefrom; a source of pressurized cooling water; jet-spray apparatus disposed with the interior of said pressure vessel; cooling water conduit communicating with the said source of pressurized cooling water and the interior jet-spray apparatus of said pressure vessel; and valve means in the said cooling water conduit for regulating the admission of condensing cooling water into the interior of said pressure vessel.

43. The reversible, jet-reaction ejector structure for marine propulsion of claim 1 wherein a plurality of displacement-type pressure vessels are disposed in parallel with respect to each other to selectively discharge pressurized motive fluids through communicating fluid conduit into each motive-nozzle supply pipe; valve means in the discharge conduit of said plurality of pressure vessels for selectively regulating the discharge of pressurized motive fluids therefrom; communicating fluid conduit between the interior of each member of the said plurality of pressure vessels and the waters exterior to the marine vessel whereby said exterior waters may be selectively admitted thereinto; valve means in the filling conduit of said plurality of pressure vessels for selectively regulating the admission of said exterior waters thereinto; a source of high pressure steam; steam supply conduit communicating with the said source of high-pressure steam and the interior of each member of the said plurality of pressure vessels; valve means in the steam supply conduit of said plurality of pressure vessels for selectively regulating the admission of high-pressure steam thereinto to expand against and selectively discharge the said exterior waters therefrom; a source of pressurized cooling water; jet-spray apparatus disposed within the interior of each member of the said plurality of pressure vessels; cooling water conduit communicating with the said source of pressurized cooling water and the interior jet-spray apparatus of each member of the said plurality of pressure vessels; and valve means in the cooling water conduit for selectively regulating the admission of condensing cooling water into the interior of each member of the said plurality of pressure vessels.

44. The reversible, jet-reaction ejector structure for marine propulsion of claim 1 wherein a plurality of displacement-type pressure vessels are disposed in parallel with respect to each other to selectively discharge pressurized motive fluids through fluid conduit into a common discharge main communicating with each of the said motive-nozzle supply pipes; valve diversion means set into the said discharge main whereby the pressurized discharge of each pressure vessel member may be alternately diverted into either motive-nozzle supply pipe; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; a common filling main communicating with each of the said filling intakes; filling conduit communicating with the interior of each member of the said plurality of pressure vessels and with the said common filling main whereby said exterior waters may be selectively admitted thereinto; and valve diversion means in the said filling main whereby the said exterior waters may be alternately admitted into the said plurality of pressure vessels from either of the said filling intakes.

45. The reversible, jet-reaction ejector structure for marine propulsion of claim 1 wherein a plurality of displacement-type pressure vessels are disposed in parallel with respect to each other to selectively discharge pressurized motive fluids through fluid conduit into a common discharge main communicating with each of the said motive-nozzle supply pipes; valve diversion means set into the said discharge main whereby the pressurized discharge of each pressure vessel member may alternately be diverted into either motive-nozzle supply pipe; valve means in the discharge conduit of each member of the said plurality of pressure vessels for selectively regulating the discharge of pressurized motive fluids therefrom; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; a common filling main communicating with each of the said filling intakes; filling conduit communicating with the interior of each member of the said plurality of pressure vessels and with the said common filling main whereby said exterior waters may be selectively admitted thereinto; valve diversion means in the said filling main whereby the said exterior waters may be alternately admitted into the said plurality of pressure vessels from either of the said filling intakes; a source of high-pressure steam; steam supply conduit communicating with the said source of high-pressure steam and the interior of each member of the said plurality of pressure vessels; and valve means in the steam supply conduit of said plurality of pressure vessels for selectively regulating the admission of high-pressure steam thereinto to expand against and selectively discharge the said exterior waters therefrom.

46. The reversible, jet-reaction, ejector structure for marine propulsion of claim 1 wherein a plurality of displacement-type pressure vessels are disposed in parallel with respect to each other to selectively discharge pressurized motive fluids through fluid conduit into a common discharge main communicating with each of the said motive-nozzle supply pipes; valve diversion means set into the said discharge main whereby the pressurized discharge of each pressure vessel member may be alternately diverted into either motive-nozzle supply pipe; valve means in the discharge conduit of each member of the said plurality of pressure vessels for selectively regulating the discharge of pressurized motive fluids therefrom; oppositely-directed filling intakes axially disposed in a parallel horizontal plane with the reversible axis of said ejector structure so that alternate intakes may receive the flow of waters exterior to the marine vessel from alternate directions similar to that from which suction fluids may enter said ejector structure; a common filling main communicating with each of the said filling intakes; filling conduit communicating with the interior of each member of the said plurality of pressure vessels and with the said common filling main whereby said exterior waters may be selectively admitted thereinto; valve diversion means in the said filling main whereby the said exterior waters may be alternately admitted into the said plurality of pressure vessels from either of the said filling intakes; valve means in the filling conduit of each member of the said plurality of pressure vessels for selectively regulating the admission of said exterior waters thereinto; a source of high-pressure steam; steam supply conduit communicating with the said source of high-pressure steam and the interior of each member of the said plurality of pressure vessels; valve means in the steam supply conduit of the said plurality of pressure vessels for selectively regulating the admission of high-pressure-steam thereinto to expand against and selectively discharge the said exterior waters therefrom; a source of pressurized cooling water; jet-spray apparatus disposed within the interior of each member of the said plurality of pressure vessels; cooling water conduit communicating with the said source of pressurized cooling water and the interior jet-spray apparatus of each member of the said plurality of pressure vessels; and valve means in the said cooling water conduit for selectively regulating the admission of condensing cooling water into the interior of each member of the said plurality of pressure vessels.

47. The reversible, jet-reaction ejector structure for marine propulsion of claim 1 wherein an individual steam generator member is disposed to separately supply pressurized motive steam through communicating means to each nozzle supply pipe.

48. The reversible, jet-reaction ejector structure for marine propulsion of claim 1 wherein an individual steam generator member is disposed to separately supply pressurized motive steam through communicating means to each nozzle supply pipe; and an individual motive-fluid throttle valve set into each nozzle supply line whereby the quantity and velocity of motive steam discharged by its respective motive-jet injection nozzle may be regulated, thereby regulating the quantity and velocity of total discharge from said jet-reaction ejector structure.

49. The reversible, jet-reaction ejector structure for marine propulsion of claim 1 wherein an individual steam generator member is disposed to separately supply pressurized motive steam through communicating means to each nozzle supply pipe; oppositely-directed raw feed water intakes for the feed water system of said steam generator member axially disposed in a parallel horizontal plane with the reversible axis of said ejector structure so that alternate intakes may receive raw feed water from alternate directions similar to that from which suction fluids may enter said ejector structure, and communicating means from each of the aforesaid intakes to the inlet of its individual companion steam generator member.

50. The reversible, jet-reaction injector structure for marine propulsion of claim 1 wherein an individual steam generator member is disposed to separately supply pressurized motive steam through communicating means to each nozzle supply pipe; an individual fluid pump for supplying pressurized feed water to each of the said steam generator members; oppositely-directed raw feed water intakes for the feed water system of said steam generator member axially disposed in a parallel horizontal plane with the reversible axis of said ejector structure so that alternate intakes may receive raw feed water from alternate directions similar to that from which suction fluids may enter said ejector structure; communicating means from each of the aforesaid intakes to the suction of its individual companion feed water pump; and communicating means from the discharge outlet of each of the said fluid pumps to the inlet of its individual companion steam generator member.

51. The reversible, jet-reaction ejector structure for marine propulsion of claim 1 wherein an individual steam-actuated displacement-type pressure vessel is disposed to separately supply pressurized motive fluids through communicating means to each nozzle supply pipe; communicating means between the waters exterior to the marine vessel and the interior of each member of the aforesaid plurality of displacement-type pressure vessels whereby said exterior waters may be selectively admitted thereinto; a source of high-pressure steam; and communicating means between the said source of high-pressure steam and the interior of each member of the aforesaid plurality of displacement-type pressure vessels whereby the high-pressure steam may be selectively admitted into each pressure vessel to expand against and discharge said exterior waters into the respective companion motive-nozzle supply pipe of said ejector structure.

52. The reversible, jet-reaction ejector structure for marine propulsion of claim 1 wherein an individual steam-actuated displacement-type pressure vessel is disposed to separately supply pressurized motive fluids through communicating means to each nozzle supply pipe; communicating means between the waters exterior to the marine vessel and the interior of each member of the aforesaid plurality of displacement-type pressure vessels whereby said exterior waters may be selectively admitted thereinto; a source of high-pressure steam; communicating means between the said source of high-pressure steam and each member of the said plurality of displacement-type pressure vessels whereby the high-pressure steam may be selectively admitted thereinto; and an individual motive-fluid throttle valve set into each nozzle supply line whereby the quantity and velocity of motive fluids discharged by its respective motive-jet injection nozzle may be regulated, thereby regulating the quantity and velocity of total discharge from said jet-reaction ejector structure.

53. The reversible, jet-reaction ejector structure for marine propulsion of claim 1 wherein an individual steam-actuated displacement-type pressure vessel is disposed to separately supply pressurized motive fluids through communicating means to each nozzle supply pipe; a source of high-pressure steam; communicating means between the said source of high-pressure steam and the interior of each member of the said plurality of displacement-type pressure vessels whereby the high-pressure steam may be selectively admitted thereinto; oppositely-directed suction intakes axially disposed in a parallel horizontal plane with the reversible axis of said ejector structure so that alternate intakes may receive motive intake waters from alternate directions similar to that from which suction fluids may enter said ejector structure; and communicating means from each of the aforesaid intakes to the inlet of its respective companion displacement-type pressure vessel member whereby waters exterior to the marine vessel may be selectively admitted into either pressure vessel.

54. The reversible, jet-reaction ejector structure for marine propulsion of claim 1 wherein an individual plurality of steam-actuated displacement-type pressure vessels is disposed to separately supply pressurized motive fluids through communicating means to each nozzle supply pipe; communicating means between the waters exterior to the marine vessel and the inlets of individual pressure vessel members of each of the said plurality of displacement-type pressure vessels whereby the said exterior waters may be selectively admitted thereinto; a source of high-pressure steam; and communicating means between the said source of high-pressure steam and the interior of each individual pressure vessel member of each of the said pluralities of displacement-type pressure vessels whereby the high-pressure steam may be selectively admitted into each pressure vessel to expand against and discharge said exterior waters into the respective companion motive-nozzle supply pipe of said ejector structure.

55. The reversible, jet-reaction ejector structure for marine propulsion of claim 1 wherein an individual plurality of steam-actuated displacement-type pressure vessels is disposed to separately supply pressurized motive fluids through communicating means to each nozzle supply pipe; a source of high-pressure steam; communicating means between the said source of high-pressure steam and the interior of each individual pressure vessel member of each of the said pluralities of displacement-type pressure vessels whereby the high-pressure steam may be selectively admitted thereinto; oppositely-directed suction intakes axially disposed in a parallel horizontal plane with the reversible axis of said ejector structure so that alternate intakes may receive motive intake waters from alternate directions similar to that from which suction fluids may enter said ejector structure; and communicating means between each of the aforesaid intakes and the inlets of individual pressure vessel members of the respective plurality of displacement-type pressure vessels whereby said exterior motive intake waters may be selectively admitted thereinto.

References Cited

UNITED STATES PATENTS

| | | | |
|---|---|---|---|
| 1,138,125 | 5/1915 | Leblanc | 230—95 |
| 1,375,601 | 4/1921 | Morize | 115—11 X |
| 2,363,335 | 11/1944 | Katcher et al. | 114—151 X |
| 3,447,324 | 6/1969 | French | 115—14 |

FOREIGN PATENTS

| | | | |
|---|---|---|---|
| 2,502 | 1868 | Great Britain | 115—14 |
| 414,497 | 9/1910 | France | 115—14 |
| 612,616 | 5/1935 | Germany | 115—14 |

ANDREW H. FARRELL, Primary Examiner